(12) United States Patent
Abe et al.

(10) Patent No.: US 11,614,910 B2
(45) Date of Patent: Mar. 28, 2023

(54) WEB CONFERENCE SYSTEM, METHOD, AND SERVER SYSTEM

(71) Applicant: CANON KABUSHIKI KAISHA, Tokyo (JP)

(72) Inventors: Koichi Abe, Kanagawa (JP); Atsushi Nakamura, Nakamura (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/379,803

(22) Filed: Jul. 19, 2021

(65) Prior Publication Data

US 2022/0027110 A1    Jan. 27, 2022

(30) Foreign Application Priority Data

Jul. 21, 2020 (JP) .............................. JP2020-124529

(51) Int. Cl.
  *G06F 15/00*  (2006.01)
  *G06F 3/12*  (2006.01)
  *H04N 1/00*  (2006.01)
  *H04L 65/403*  (2022.01)

(52) U.S. Cl.
  CPC .......... *G06F 3/1287* (2013.01); *G06F 3/1203* (2013.01); *G06F 3/1232* (2013.01); *H04L 65/403* (2013.01); *H04N 1/00403* (2013.01)

(58) Field of Classification Search
  CPC .... G06F 3/1287; G06F 3/1203; G06F 3/1232; H04N 1/00403; H04L 65/403
  USPC ......................................................... 358/1.15
  See application file for complete search history.

(56) References Cited

U.S. PATENT DOCUMENTS

2016/0261648 A1*  9/2016  Ruetschi ............... H04L 65/403
2017/0054870 A1*  2/2017  Oe ....................... H04B 1/3833

FOREIGN PATENT DOCUMENTS

JP        2019144697 A        8/2019

* cited by examiner

*Primary Examiner* — Mark R Milia
(74) *Attorney, Agent, or Firm* — Canon U.S.A., Inc., IP Division

(57) ABSTRACT

A web conference system is provided whereby a second apparatus transmits first information indicating whether a printer is connected to a second apparatus or second information indicating setting related to the printer connected to the second apparatus to a server. The server transmits the first information or the second information to a first apparatus. The first apparatus displays printer information about the printer connected to the second apparatus on a display screen based on the first information or the second information.

13 Claims, 15 Drawing Sheets

WEB CONFERENCE SYSTEM, METHOD, AND SERVER SYSTEM

BACKGROUND

Field

The present disclosure relates to a web conference system, a processing method, and a server system.

Description of the Related Art

There have heretofore been web conference systems for holding a conference between members in remote locations. In a web conference system, a plurality of information processing apparatuses owned by a plurality of people in remote locations is connected online via the Internet. The web conference system includes various functions for holding a conference equivalent to one held in the same space. Among such functions are a function of sharing the screen of a presenter's information processing apparatus displaying materials (desktop sharing), a function of implementing voice conversation between participants (voice chat), and a video image sharing function of making the participants mutually visible.

Meanwhile, printers are now prevalent in various locations including homes, and printing can be performed from personal computers (PCs) via a Universal Serial Bus (USB) or a network such as a wireless local area network (LAN). Printers can also be connected to the Internet via a LAN and a router.

Japanese Patent Application Laid-Open No. 2019-144697 discusses printing of content on the cloud by a printer, as well as printing on a printer via the Internet from a terminal located at a different location from where the printer is.

In a conference using the foregoing web conference system, sharing printed information between a plurality of participants may be needed aside from the sharing of the display screen. Since the participants are using the web conference system when such information sharing is needed in some cases, the information is desirably shared by using at least part of the web conference system.

SUMMARY

The present disclosure is directed to providing a technique for enabling easy sharing of printed information between a plurality of participants in a web conference system.

A web conference system includes a server system including one or a plurality of server apparatuses configured to provide a web conference service, a first apparatus including a first application for holding a web conference, and a second apparatus including a second application for holding a web conference. The server system includes an acceptance unit configured to accept participation requests for the web conference from the first and second applications, and a first transmission unit configured to transmit voice data transmitted from the first application to the second application and transmit voice data transmitted from the second application to the first application based on the acceptance of the participation requests from the first and second applications by the acceptance unit. The second apparatus includes a first output unit configured to, if the voice data is transmitted by the first transmission unit, output sound based on the voice data by using the second application, and a second transmission unit configured to transmit first information or second information to the server system by using the second application, the first information indicating whether a printer configured to print an image is connected to the second apparatus, the second information indicating a setting related to the printer connected to the second apparatus. The first apparatus includes a second output unit configured to, if the voice data is transmitted by the first transmission unit, output sound based on the voice data by using the first application, a display control unit configured to display printer information about the printer connected to the second apparatus on a display screen by using the first application, and a print instruction unit configured to instruct the second apparatus to perform printing via the server system by using the first application. The first transmission unit of the server system is further configured to transmit the first information or the second information to the first application based on the acceptance of the participation requests from the first and second applications by the acceptance unit, and the display control unit of the first apparatus is configured to display the printer information on the display screen based on the first information or the second information transmitted by the first transmission unit.

Further features of the present disclosure will become apparent from the following description of exemplary embodiments with reference to the attached drawings.

DESCRIPTION OF THE EMBODIMENTS

Figure 1:
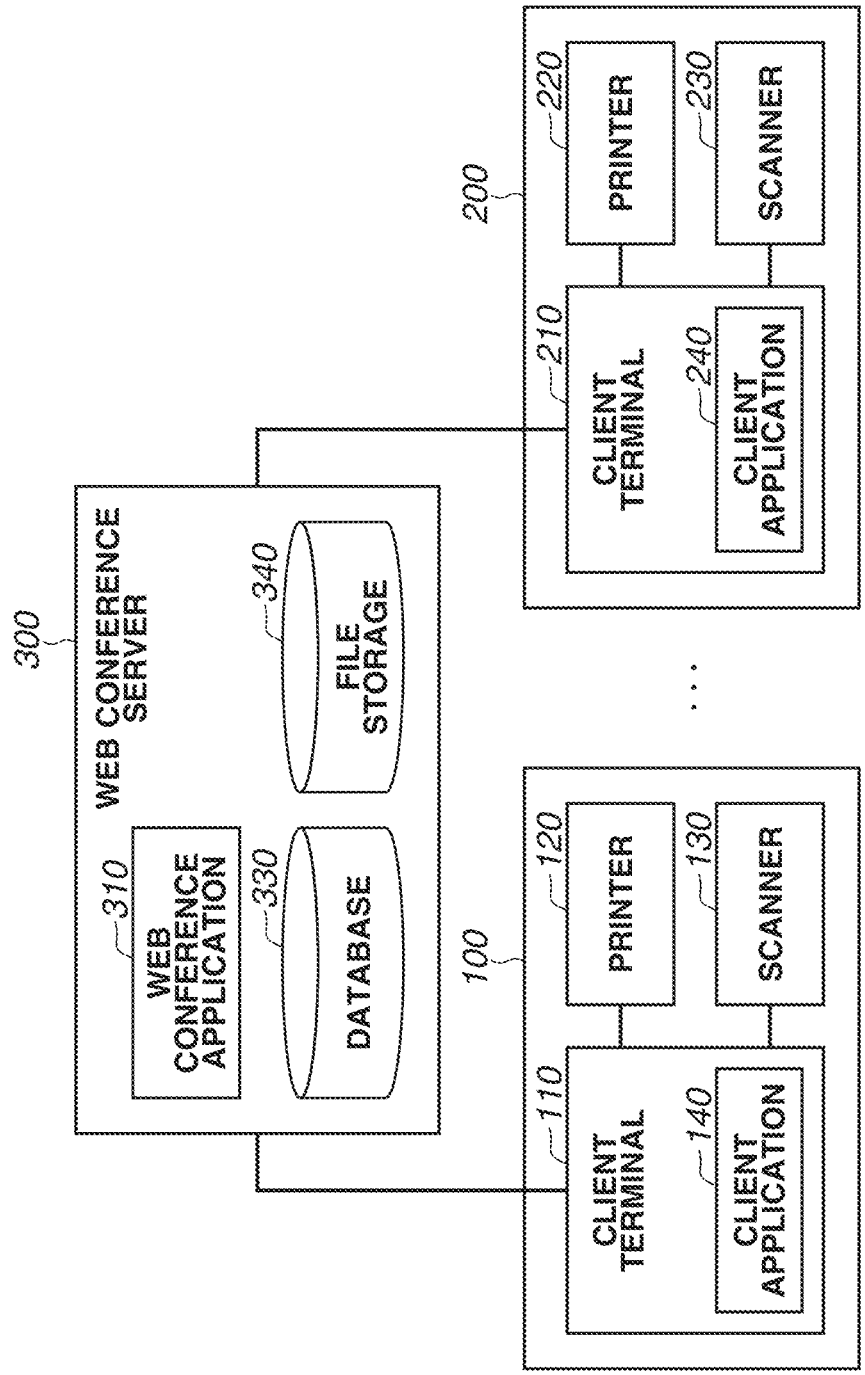
FIG. 1 is a diagram illustrating an example of a configuration of a web conference system including information processing apparatuses.

Exemplary embodiments of the present disclosure will be described in detail below with reference to the attached drawings. The following exemplary embodiments are not intended to limit the present disclosure set forth in the claims, and all combinations of features described in the exemplary embodiments are not necessarily indispensable to the solving means of the present disclosure. Similar components are designated by the same reference numerals, and a description thereof will be omitted.

A first exemplary embodiment will be described below. FIG. 1 is a diagram illustrating an example of a configuration of a web conference system including information processing apparatuses. Information processing systems 100 and 200 are systems including client terminals 110 and 210 and peripheral devices. Examples of the client terminals 110 and 210 include an ordinary personal computer (in the following description, may be referred to as a PC or a computer), a smartphone, and a tablet. The client terminals 110 and 210 may be different types of devices. For example, the client terminal 110 may be a personal computer, and the client terminal 210 a smartphone. The following description will be given by using a case where both the client terminals 110 and 210 are personal computers as an example. The client terminal 110 and the client terminal 210 will also be referred to as a "personal computer 110" and a "personal computer 210".

In the information processing systems 100 and 200, the personal computers 110 and 210 are ordinary personal computers. Printers 120 and 220 are printer apparatuses located near the personal computers 110 and 210, respectively, as peripheral devices mentioned above. The printers 120 and 220 are respectively connected to the personal computers 110 and 210 by a Universal Serial Bus (USB), a wired local area network (LAN), or a wireless LAN. Scanners 130 and 230 are scanner apparatuses located near the personal computers 110 and 210, respectively, as peripheral devices mentioned above. The scanners 130 and 230 are respectively connected to the personal computers 110 and 210 by a USB, a wired LAN, or a wireless LAN. The personal computers 110 and 210 are each connected to the Internet via a LAN. In FIG. 1, the personal computers 110 and 210, the printer apparatuses, and the scanner apparatuses are directly connected, whereas the personal computers 110 and 210, the printer apparatuses, and the scanner apparatuses may be connected via an access point (such as a wireless LAN router). The personal computers 110 and 210, the printer apparatuses, and the scanner apparatuses may be connected to the Internet via the access point. In such a case, the personal computers 110 and 210, the printer apparatuses, and the scanner apparatuses are each connected to a web conference server 300 to be described below via the Internet.

The web conference server 300 is a server on the Internet, and provides a web conference service. The web conference server 300 is a server system including one or a plurality of server apparatuses. If the web conference server 300 includes a plurality of server apparatuses, the functions of the web conference server 300 to be described below are implemented by the plurality of server apparatuses performing processing in a cooperative manner.

To use the web conference service provided by the web conference server 300, a client application (in the following description, may be referred to as an application) supporting the web conference service is installed on the conference participants' personal computers. The conference participants can participate in a web conference by installing the predetermined client application on their computers and executing the client application. FIG. 1 illustrates client applications 140 and 240 for the web conference system. The web conference server 300 executes a web conference application 310. The web conference server 300 uses a database 330 and a file storage 340.

In the web conference system illustrated in FIG. 1, both the information processing systems 100 and 200 can be installed in remote locations. For example, the information processing systems 100 and 200 are located in the two participants' homes or offices. The number of information processing systems is not limited to two. For example, if ten conference participants participate in a web conference from their respective homes, ten information processing systems can be installed.

The web conference server 300 transmits users' (participants') voice data received from the personal computers in the respective plurality of information processing systems to the other personal computers. For example, suppose that there are three or more personal computers, and a user's voice data is transmitted from the personal computer in one of the information processing system to the web conference server 300. In such a case, the web conference server 300 transmits the voice data to the other two or more personal computers. In such a manner, with three or more participants operating three or more personal computers, the voice of one of the participants is delivered to the other participants and thereby a web conference can be held. Voice control processing including the reception and transmission of voice data is performed by the web conference application 310 of FIG. 1. As described above, the client terminals 110 and 210 are communicably connected via the web conference server 300.

Figure 2:
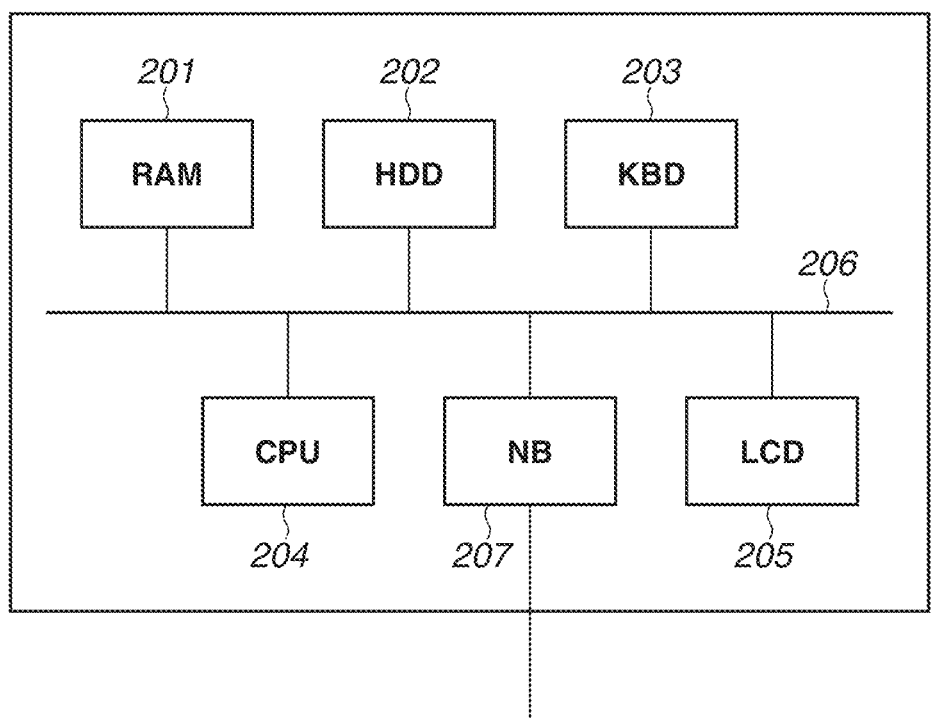
FIG. 2 is a diagram illustrating a hardware configuration of a personal computer.

FIG. 2 is a diagram illustrating an example of a hardware configuration of a personal computer. The personal computers 110 and 210 include the pieces of hardware illustrated in FIG. 2. As illustrated in FIG. 2, the personal computers 110 and 210 include a random access memory (RAM) 201 that is a RAM unit, a hard disk drive (HDD) 202 that is an HDD unit, a keyboard (KBD) 203 that is a KBD unit, and a central processing unit (CPU) 204. The personal computers 110 and 210 further include a liquid crystal display (LCD) 205 that is a display, and a network board (NB) 207. The personal computers 110 and 210 also include a bus 206 that communicably connects at least the blocks illustrated in FIG. 2 to each other. The HDD 202 serves as a storage unit of the personal computer 110 or 210, for example. Instead of an HDD, a portable Compact Disc Read-Only Memory (CD-ROM) or a built-in read-only memory (ROM) may be used as the storage unit of the personal computer 110 or 210. The KBD 203 is an input unit of the personal computer 110 or 210, for example.

The CPU 204 is a control unit of the personal computer 110 or 210, for example. The LCD 205 is a display unit of the personal computer 110 or 210, for example. The NB 207 is a communication control unit of the personal computer 110 or 210, for example, and connected to an external apparatus. The processing by the CPU 204 to be described below may be performed by a plurality of processors. The KBD 203 and the LCD 205 do not need to be included inside the personal computer 110 or 210, and may be connected to the personal computer 110 or 220 as an external input apparatus and an external display apparatus.

Applications, such as the client applications 140 and 240 and a web browser 83, and modules (software) illustrated in FIG. 3 are stored in the HDD 202, for example, and read into the RAM 201 and executed by the CPU 204 as appropriate. The CPU 204 thereby implements the functions of the applications, such as the client applications 140 and 240 and the web browser 83, and the modules (software) illustrated in FIG. 3. Various software modules to be described below with reference to FIG. 3 may be distributedly stored in a plurality of storage units included in the personal computer 110 or 210. In other words, various types of processing by the personal computers 110 and 210 to be described below may be implemented by a plurality of processors executing a plurality of software modules stored in a plurality of storage units. In the following description, the client application 140 and the client application 240 may be referred to simply as an "application 140" and an "application 240".

Figure 3A:
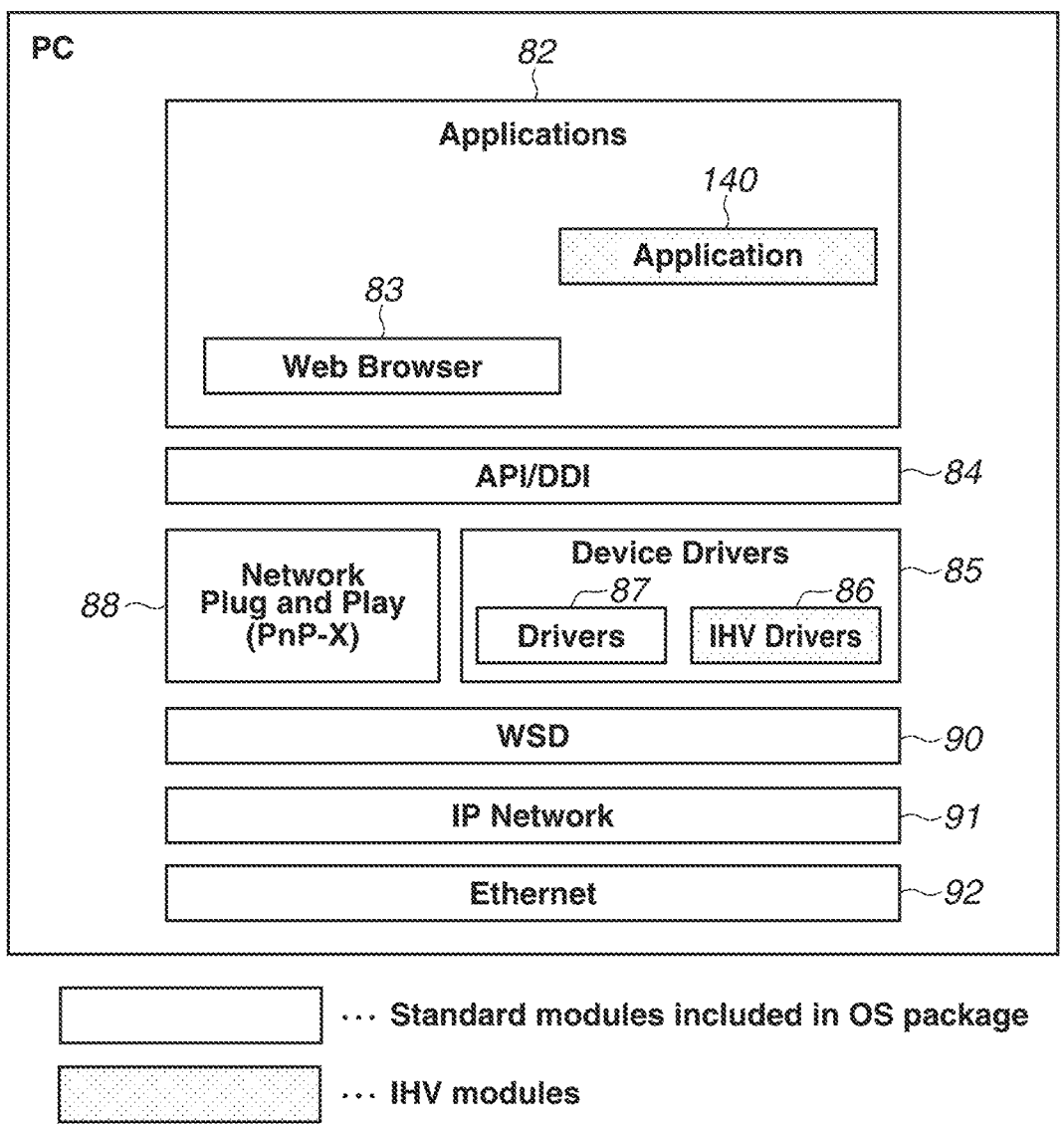
FIGS. 3A and 3B are diagrams illustrating a software configuration of the personal computer.
Figure 3B:
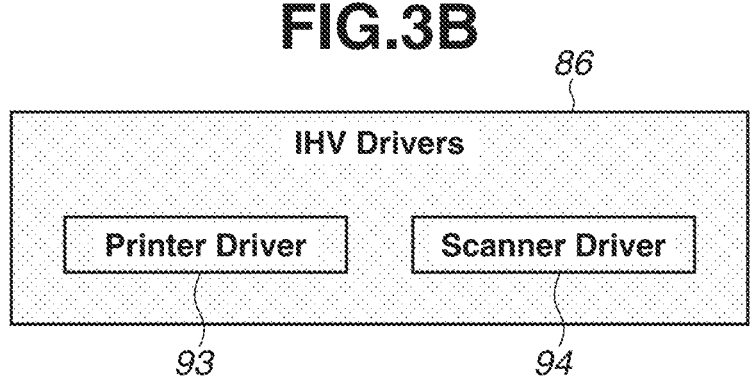

FIGS. 3A and 3B are diagrams illustrating an example of a software module configuration of the personal computer 110 or 210. In FIG. 3A, a module 92 is an Ethernet® control stack for controlling Ethernet®. A module 91 is an Internet Protocol (IP) network control stack for controlling an IP network. A module 90 is a Web Service on Devices (WSD) control stack for controlling WSD that provides a mechanism for device search on a network. A module 88 is a plug and play Extensions (PnP-X) control stack for controlling network PnP. The PnP-X refers to a series of extension functions for supporting network-connected devices. The PnP-X functions are standard features of the Windows® 10 operating system (OS). A module 85 is a group of device drivers and includes a group of standard drivers 87, which is a standard set of drivers included in the OS package, and a group of independent hardware vendor (IHV) drivers 86 provided by IHVs.

A module 84 is an application/device driver interface (DDI) interface and includes application programing interfaces (APIs) and DDIs. The module 140 is a client application for the web conference system, for example. The module 83 is a web browser application, for example. A module 82 is a group of applications, and includes the client application 140 and the web browser 83.

In FIG. 3B, the group of IHV drivers 86 includes a printer driver 93 for controlling the printer 120 or 220, and a scanner drier 94 for controlling the scanner 130 or 230.

The one or plurality of server apparatuses included in the web conference server 300 of FIG. 1 each includes one or a plurality of processors and one or a plurality of storage units. The one or plurality of processors executes programs (such as the web conference application 310) stored in the one or plurality of storage units, whereby the web conference service is provided.

Figure 4:
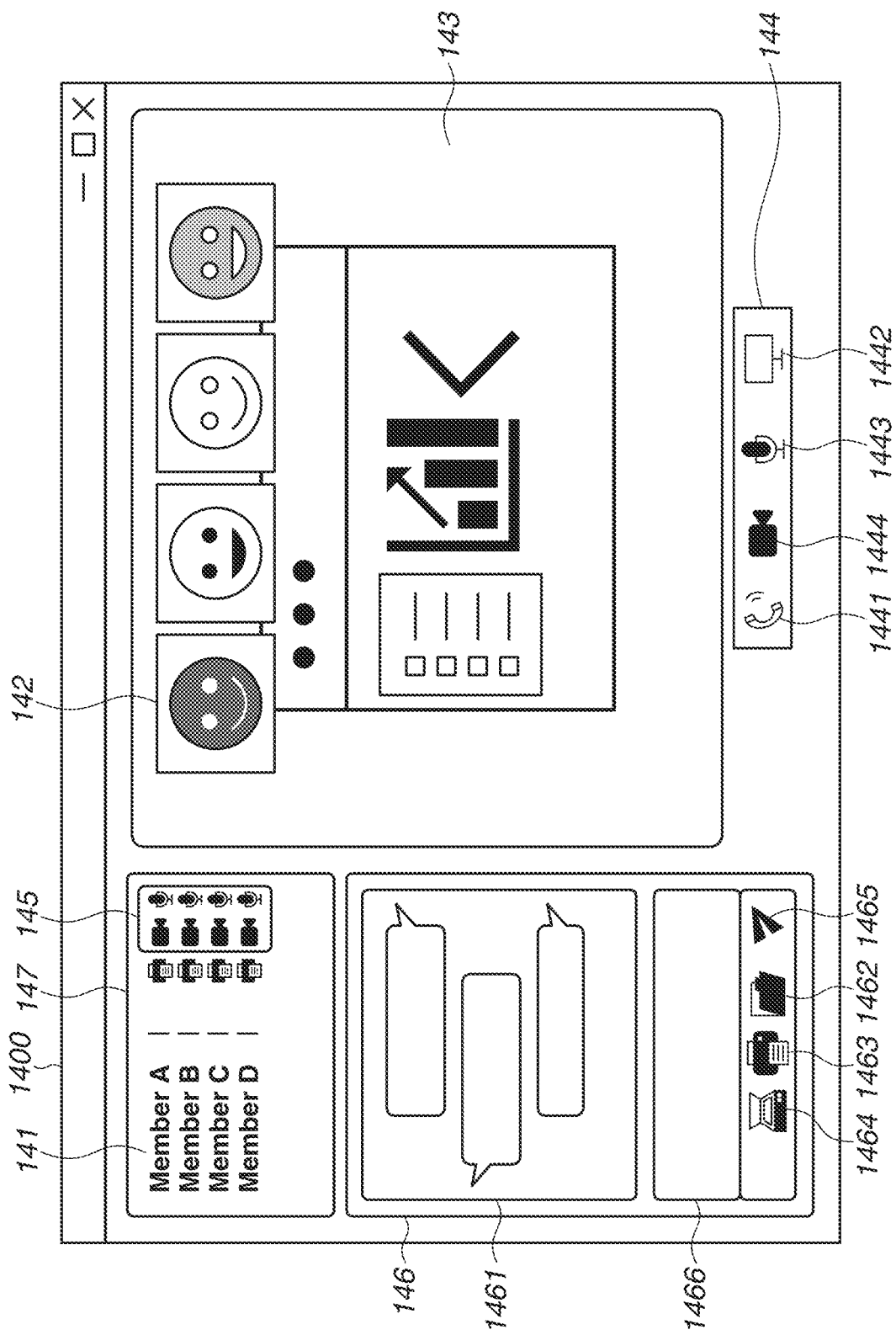
FIG. 4 is a diagram illustrating a main screen of a client application of the web conference system, running on the personal computer.

FIG. 4 illustrates a main screen 1400 of the client applications 140 and 240 of the web conference system, running on the personal computers 110 and 210. A window 141 shows a list of members (participants) participating in a web conference and device states of the respective members. Display sections 142 are intended for video images of the members participating in the web conference. The participants' video images captured by cameras connected to (or built in) the personal computers used by the participating members are distributed and displayed in the display sections 142. A window 143 displays a computer screen of a member given display authority among the members participating in the web conference, and the computer screen is distributed to the conference participants. For example, if a presenter using the information processing system 100 gives a presentation, the presenter obtains desktop display authority and displays presentation material data on the screen of his/her own personal computer 110. The screen being displayed on the personal computer 110 is then displayed on the client terminal (personal computer) 210 of the information processing system 200 via the client application 140 and the web conference application 310. Here, the display data on the screen is transmitted from the client application 140 of the information processing system 100 to the web conference application 310 in real time. In other words, the presenter distributes the presentation material by displaying the presentation material on the desktop screen and distributing the screen for display. If the presenter changes the page of the presentation material to be displayed, the changed page is displayed in the window 143 of FIG. 4 in real time.

Buttons 144 can be operated by the participant. Specifically, the participant operates a button 1441 to give an instruction about the participation and exit of the participant himself/herself in/from a web conference. A button 1444 switches on/off a video distribution function using images captured by a camera of the participant's own personal computer. A button 1443 switches on/off a voice speech function. A button 1442 switches on/off a desktop sharing function. The presentation data can be displayed (shared with the other participants) as described above by operating the button 1442.

A status display section 145 displays the on/off states of video distribution, voice speech, and desktop sharing functions of all the participants' apparatuses, including each participant's own apparatus, based on the participants' operations on the buttons 144. An operation screen 146 is intended to transmit and receive text messages and files, transmit and receive scanned images, and transmit and receive print data between the participants of the web conference.

A display section 147 displays the statuses of the printers that the respective participants use for printing in the web conference system. The display section 147 displays the statuses of the printers connected to the personal computers of the respective conference participants. A message display section (chat window) 1461 displays the content of mutual communications in transmitting and receiving text messages and files, transmitting and receiving scanned images, and transmitting and receiving print data between the participants. A file selection button 1462 is intended to select a target file for file transmission and reception. A print data selection button 1463 is intended to cause the printers owned by the other participants to perform printing in the web conference system. An icon button 1464 is intended to scan a document using the scanner connected to the personal computer operated by the participant and capture the scanned image into the client application operated by the participant himself/herself. A transmission button 1465 is intended to transmit a text message, file, scanned image, or print data. A message input dialog box 1466 is intended to input a text message in transmitting the text message.

Figure 5:
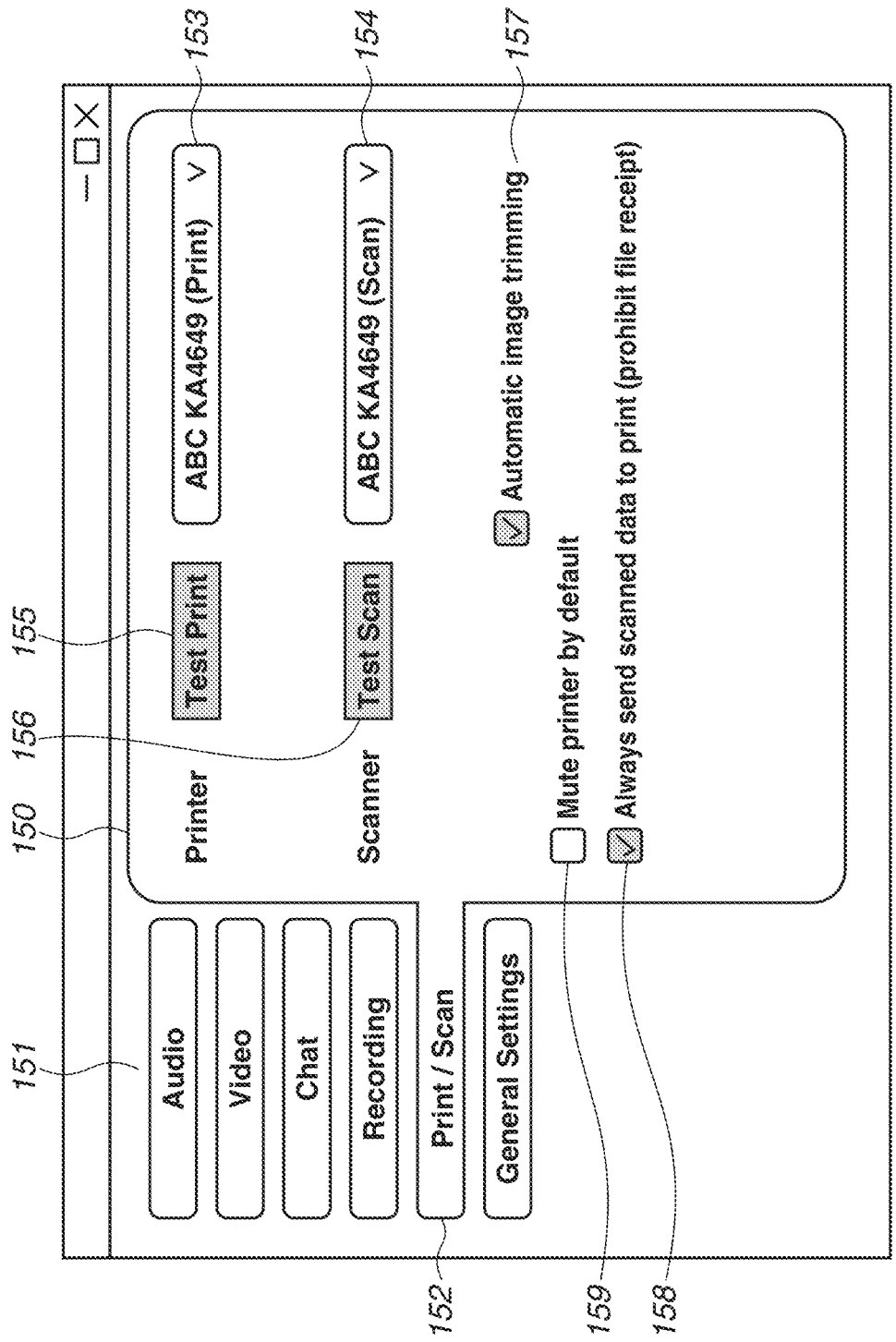
FIG. 5 is a diagram illustrating an input/output device setting screen of the client application of the web conference system, running on the personal computer.

FIG. 5 illustrates an input/output device setting screen 150 to be displayed by the client applications 140 and 240 of the web conference system, running on the personal computers 110 and 210. A menu 151 lists the setting items of the client application. The setting items include a menu selection button 152 for calling a printer and scanner setting screen. A printer selection menu 153 is intended to select a printer that the client application of each apparatus causes to print. A scanner selection menu 154 is intended to select a scanner that the client application of each apparatus causes to read a document.

A button (test print button) 155 is intended to run a test print. If the button 155 is operated, the client application transmits a print instruction and predetermined data to the printer selected by the printer selection menu 153. If the data is printed by the printer, the user can determine that the print instruction is normally given from the client application to the printer and the print operation is normally performed by the printer. The foregoing predetermined data is stored into the personal computer simultaneously with the installation of the client application, and read out by the client application in response to the operation on the button 155. Like normal printing by the client application, the foregoing test print is performed via the printer driver corresponding to the selected printer.

A button (test scan button) 156 is intended to run a test scan. If the button 156 is operated, the client application issues a scan instruction to the scanner selected by the scanner selection menu 154. Receiving the scan instruction, the scanner performs a scan. The resulting scanned image is transmitted from the scanner to the client application and displayed by the client application. By observing the display, the user can determine that the scan instruction is normally issued by the client application and the scan operation is normally performed by the selected scanner.

A checkbox 157 sets whether to automatically perform image optimization processing, such as image quality adjustment, keystone correction, and cropping, on a scanned image when a scan instruction is given from the client application. A checkbox 158 selects whether to transmit a scanned image as a file or cause a printer to output the scanned image when the client application transmits the scanned image to a conference participant. A checkbox (print mute setting checkbox) 159 can set in advance whether to perform printing based on print data when the print data is transmitted from another participant during a conference.

Figure 6:
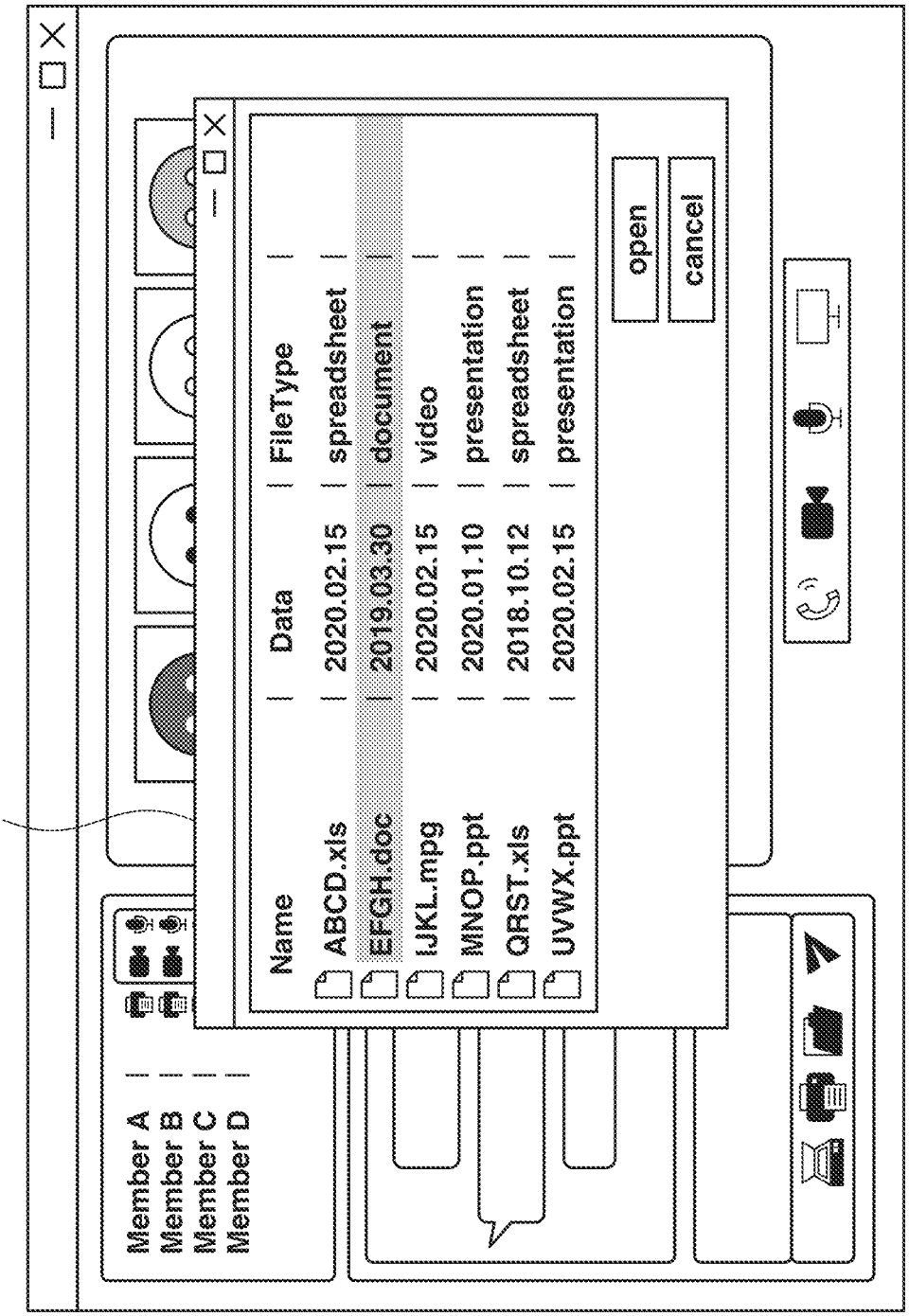
FIG. 6 is a diagram illustrating a file selection dialog.

FIG. 6 is a diagram illustrating a file selection dialog 160 displayed in transmitting data to be printed by using the web conference system. The file selection dialog 160 is displayed when the print data selection button 1463 is pressed.

Figure 8:
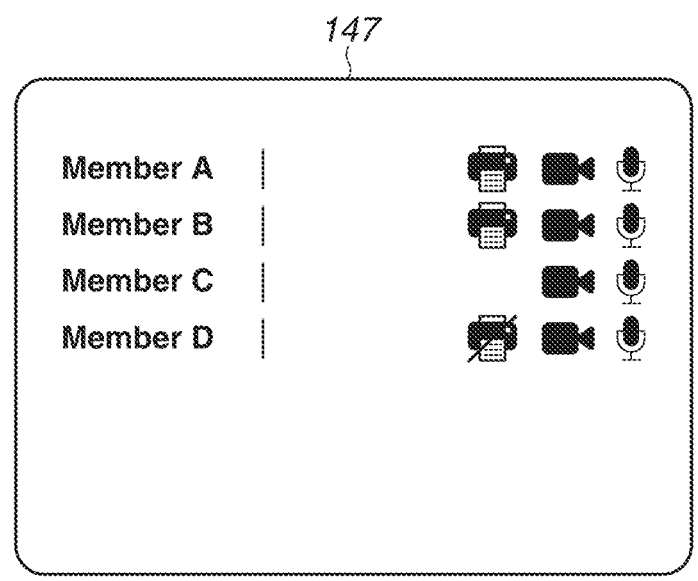
FIG. 8 is a diagram illustrating a list of conference participants and a status display of the participants' input/output devices.

FIG. 8 illustrates a list of conference participants and the status display of the respective participants' input/output devices, displayed on the client applications of the web conference system according to the present exemplary embodiment.

[Processing Sequence]
(Processing for Registering Printer Apparatus and Scanner Apparatus in Application)

Preparations to be made by a participant before a web conference to use the web conference service from the information processing system 100 will be described. The preparations can similarly be performed on the information processing system 200 and other not-illustrated information processing systems having a similar configuration to that of the information processing systems 100 and 200.

To use the web conference service, the participant initially joins the web conference service, i.e., creates a service account. An account identifier (ID) for using the web conference service is given as a result of the account creation. When using the web conference service, each participant signs in to the web conference service by using his/her own account ID and password.

Next, to use the web conference service of the present exemplary embodiment as described above, the participant sets up the client application 140. The user downloads an installation program published on a predetermined server on the Internet by the web conference service and executes the installation program, whereby the client application 140 is installed. After the completion of the execution of the installation program, the client application 140 can be run on the OS.

Next, preparations related to the devices included in the information processing system 100 will be described as preparations for using the client application 140 in a conference. In particular, registration and initial settings of the printer apparatus and the scanner apparatus to be used in a web conference will be described. Before joining the web conference using the client application 140, the user sets the hardware devices to be used by the client application 140. For setup, the user activates the installed client application 140 to display the input/output device setting screen 150 illustrated in FIG. 5. The menu 151 lists the setting items of the client application 140. The user can switch setting screens by selecting a desired setting item from the menu 151. The user makes application settings on the switched setting screen. Settings related to a voice speech at a web conference are made on an "audio" setting menu. Specifically, a speaker or headphone device and a microphone device for the application 140 to use on the system are selected on the "audio" setting menu. Moreover, instructions to run a test on such devices are given, and volume adjustments and a setting as to whether to mute the microphone as an initial state are made, on the "audio" setting menu. A web camera device for the application 140 to use on the system is selected and tested, and settings related to video distribution on a web conference are made, on a "video" setting menu. The settings related to video distribution include volume adjustments and a setting as to whether to mute the microphone as an initial state. Account information used for holding a web conference are set on an "account" setting menu.

The menu selection button 152 is intended to call a printer and scanner setting screen 150 among the setting screens of the application 140. If the menu selection button 152 is pressed, the input/output device setting screen 150 for making printer- and scanner-related settings is displayed. As described above, the input/output device setting screen 150 includes the printer selection menu 153 for selecting the printer that the client application 140 causes to print. Specifically, the printer selection menu 153 is a pull-down menu, and displays as options the names of printers connected to the information processing system 100 and corresponding to printer drivers registered in the OS. The user selects a printer to be used for printing during a conference from the list of printer names displayed as the options. The client application 140 can run a test print on the selected printer to check whether the selected printer can normally perform printing. The test print button 155 is the button for giving an instruction to run a test print. If the button 155 is pressed, test print data is transferred from the client application 140 to a printer driver instance of the selected printer. Normal printing from the application 140 to the printer apparatus can be confirmed by a print output from the printer apparatus via the printer driver.

As described above, the scanner selection menu 154 is intended to select a scanner apparatus to be used in capturing a scanned image into the client application 140. Like the printer selection menu 153, the scanner selection menu 154 is a pull-down menu and displays as options the names of scanners connected to the information processing system 100 and corresponding to scanner drivers registered in the OS. The user selects a scanner apparatus to be used as the scanner 130 during a conference from the list of scanner names displayed as the options. As described above, the user can check whether the client application 140 can normally issue an instruction for a scan operation to the selected scanner and capture a scanned image. Specifically, the input/output device setting screen 150 includes the test scan button 156 for giving an instruction to run a test scan for the checking. If the test scan button 156 is pressed, the client application 140 issues an instruction for a scan operation to the scanner 130, captures a scanned image, and displays the scanned image. The user can thereby check that a scanned image can be normally captured from the scanner apparatus into the application 140.

The checkboxes 157 and 158 make settings related to the scan operation by the application 140. The checkbox 159 makes a setting related to the print operation of the application 140. Specifically, the checkbox 157 sets whether to automatically perform optimization processing on an image, such as an image quality adjustment, keystone correction, and cropping on a scanned image, when a scan instruction is given from the client application 140. The checkbox 158 switches whether to always cause the other participants' client applications to print when the client application 140 transmits a scanned image to the conference participants. If the checkbox 158 is checked as illustrated in FIG. 5, the client application 140 transmits a scanned image and a print instruction for the scanned image to the web conference application 310. The other participants' client applications receive the scanned image and the print instruction via the web conference application 310, and cause their respective printers to print the scanned image via the printer drivers. On the other hand, if a document is scanned with the checkbox 158 unchecked, the foregoing print instruction is not transmitted and the scanned image is displayed on the screens of the other participants' client applications instead of being printed. In such a case, the other participants' client applications can print the displayed scanned image based on instructions from the respective participants. The print mute (print rejection) setting checkbox 159 can make a setting to always refuse to output print data transmitted from other participants during a conference. Suppose, for example, that the client application 140 transmits a scanned image and a print instruction with the checkbox 158 checked. In such a case, if a client application receiving the print instruction is in a print-muted (print rejection) state, the client application does not perform printing.

(Conference Participation Processing)

If a conference host sets up an online conference using the web conference service, an ID (conference ID) for identifying the conference is usually assigned. The ID is typically given in the form of a Uniform Resource Identifier (URI). When the conference host contacts conference participants about the opening of the conference, the conference host shares the URI with the conference participants to enable the participants to participate in the conference. The conference participants can join the web conference by executing the foregoing client applications. For example, an invited participant accesses the web conference server 300 at the scheduled conference date and time by executing the application, using the URI set as the conference ID. Here, the web conference application 310 of the web conference server 300 requests the client application to input the foregoing account ID and a password as appropriate. If correct account ID and password are input from the client application to the web conference application 310, the participant can join the web conference. Specifically, the web conference application 310 transmits to the client application information indicating permission for the participation of the client application in the web conference.

The web conference application 310 performs such participation permission processing for a plurality of participants (plurality of client applications). The web conference application 310 of the web conference server 300 performs acceptance processing for accepting participation requests for the web conference from the plurality of client applications and the participation permission processing in such a manner.

The description will be given again to the main screens 1400 of the client applications 140 and 240 of the web conference system illustrated in FIG. 4, which are running on the personal computers 110 and 210, respectively. If the web conference participation processing is completed by a participant's operation, information about the participant is added to the main screen 1400 of the application operated by the participant and those of the applications operated by the other participants. Specifically, like the list in the window 141 of the main screen 1400, the members participating in the web conference are listed. The information (for example, account ID) about the participant is displayed here. The display section 147 displays the device states of the respective members. The status display section 145 displays the statuses of the input/output functions of the respective members' client terminals, whereby the operating states of video distribution, voice speech, and desktop sharing are displayed on the respective participants' client terminals and shared between the participants. The display section 147 also displays device information about the printers used by the participants. Specifically, if devices (such as cameras, microphones, and printers) accessible by the client applications are connected, icons representing the devices are displayed. The states related to the video distribution, voice speech, and printing by the respective participants' client applications can thus be shared between the participants.

The information in the display section 147 is displayed by the web conference application 310. Specifically, the web conference application 310 manages the information about the participants participating in the web conference and transmits the information to the client applications, whereby the list in the window 141 is displayed. The foregoing device information is also displayed by the web conference application 310 based on information from the client applications.

For example, a client application can determine whether a printer capable of performing printing is connected to the personal computer by referring to the OS settings of the personal computer. If such a printer is found, the client application transmits information indicating the presence of the printer to the web conference application 310. Based on the information, the web conference application 310 issues instructions to display the printer icon to the client applications. The presence of printers in the plurality of respective information processing systems is thus shared between the plurality of client applications. As described above, printing by a printer can be rejected by the print mute setting made on the client application. If a printer is found by a client application, information about whether the print mute setting is made is also transmitted from the client application to the web conference application 310. The web conference application 310 transmits printer icon display instructions to the client applications based on the print mute setting. The client applications perform display control to display different printer icons depending on the printer icon display instructions. For example, printer icons may be displayed in different colors. If the print mute setting is made, the printer icon may be displayed with a slash superimposed thereon. By such processing, information about whether each client application (in other words, each participant) is capable of printing and whether printing is permitted can be shared between the plurality of participants. Details will be described below with reference to FIG. 8. While the description has been given by using printing and printers as an example, similar processing may be performed for document scanning and scanners. In such a case, information about whether the participants are capable of scanning and whether the scan function is enabled are expressed by scan icons. Here, both printer icons and scanner icons may be displayed.

If the information processing system of a participant does not include a video camera function or voice input/output devices such as a microphone, speaker, and headset, the corresponding device icon located next to the participant name is grayed out. Similarly, if no printer is connected to the personal computer of an information processing system, the printer icon is grayed out.

The buttons 144 control the participation and exit of the user himself/herself in/from the web conference, and the turning on/off of the camera image video distribution function, the voice speech function, and the desktop sharing function of the own information processing system. The button 1441 controls the participation and exit in/from the conference. The button 1442 controls the start and end of sharing of his/her own personal computer screen with the other conference participants. The buttons 1443 and 1444 control the start and stop of the voice sharing by the microphone input and the video sharing by the video input of his/her own personal computer, respectively. The buttons 1443 and 1444 are used when the devices are usable by the application but the participant does not want to share the video image of his/her own face with the other participants, or when the participant stops, pauses (mutes), or resumes sharing his/her own voice. The states of the microphone function and the video function controlled by using the buttons 1443 and 1444 are displayed as the statuses of the input/output functions in the foregoing display section 145, whereby the states are also shared with the other participants. If a conference is started, the participants' video images are displayed (distributed to the participants) on the display sections 142 for displaying the video images of the members participating in the web conference on the main screen 1400, via the cameras connected to the members' personal computers. The window 143 displays the distributed screen of the personal computer of the participant having obtained the authority to display the computer screen by operating the button 1442. Usually when a presentation is given using materials, the presenter obtains the authority for screen display and gives the presentation while displaying his/her own personal computer screen where the presentation materials are displayed to the other participants. The participants' voices during the presentation and conversations at the conference are shared between all the participants via the microphones connected to the participants' computers, and heard through the speakers or headsets. A user may not want to share his/her voice, like when the presenter is giving a presentation or when the user has a conversation that is desired to not be heard by the conference participants. In such cases, the user can press the button (voice control button) 1443 to mute the microphone voice input function. The plurality of participants in the web conference can also transmit and receive text messages and files to/from each other as appropriate by each participant using the message display section 1461, the file selection button 1462, and the transmission button 1465.

(Processing in Transmitting Print Data to a Participant's Printer)

Now, operations for transmitting and receiving print data between participants of the web conference will be described. Suppose that a participant A participates in a web conference using the personal computer 110 included in the information processing system 100, and a participant B participates in the web conference using the personal computer 210 included in the information processing system 200. Suppose that the participant A, to share a file stored in his/her own personal computer in the form of a printout paper medium, has the participant B perform printing during the web conference. Examples of such a use case where information is shared in the form of a paper medium include a case where the information sharing in the form of a paper output is desirable due to security reasons such as prevention of digital information leakage. Other examples include a case where browsing on a computer screen is difficult because table data includes large numbers of rows and columns or document data includes a large number of pages. In such cases, information can be shared between participants by browsing data-printed sheets may be desirable.

Operations by the participant A for such information sharing will initially be described. Suppose that the main screen 1400 is displayed by the client application 140 of the personal computer 110. The operation screen 146 is intended to transmit and receive text messages and files, transmit and receive scanned images, and transmit and receive print data between participants in a web conference. The display section 147 displays the states of the printers connected to the personal computers of the respective conference participants. When the participant A selects and presses the participant B in the list of participants, a chat session between the participants A and B is opened, and the message display section 1461 for displaying their messages is displayed. In addition to a text chat and file transmission, the participant A can make a print output to the participant B, and the participant B to the participant A, by operating the print data selection button 1463 and the transmission button 1465.

Figure 7:
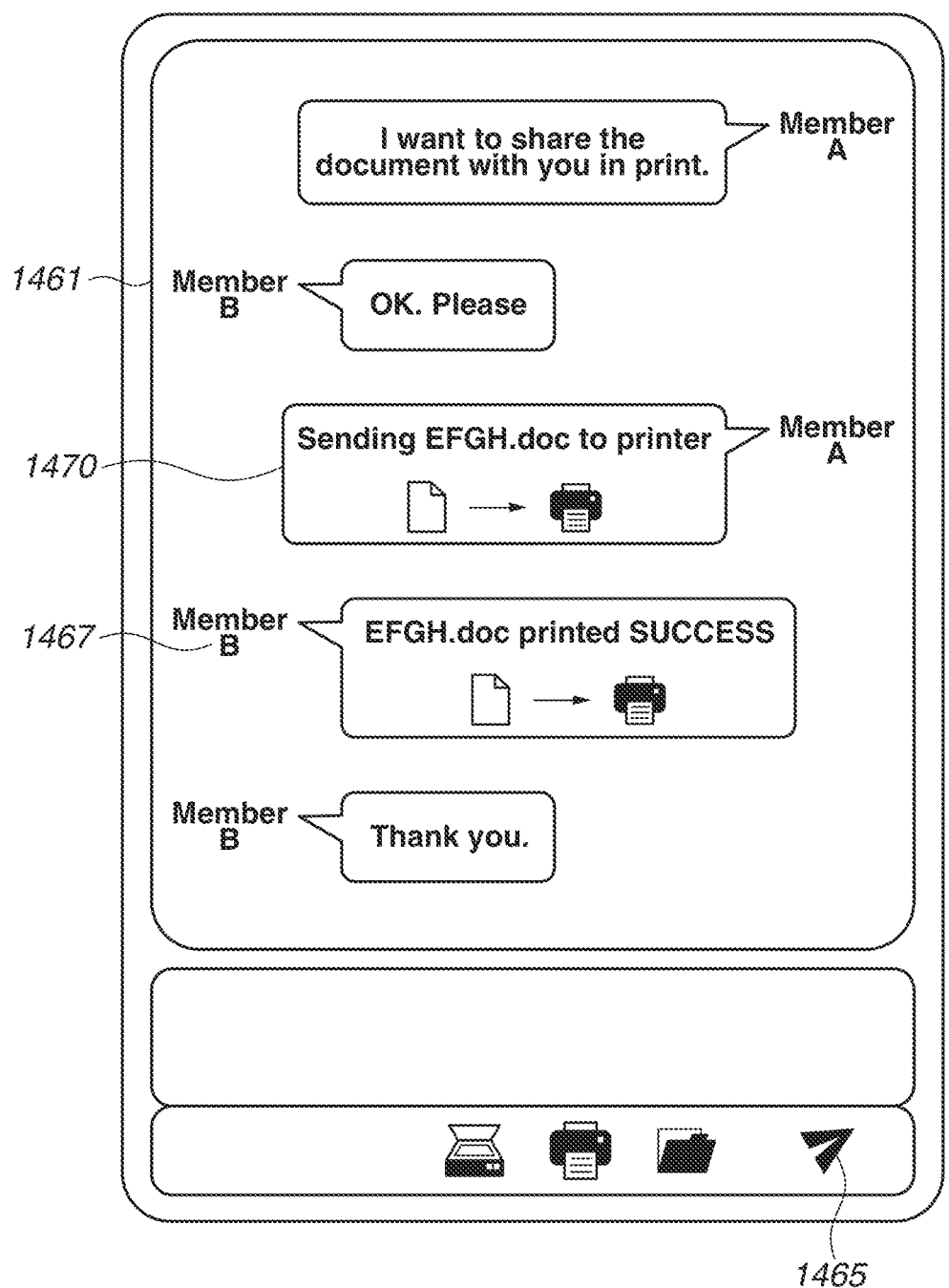
FIG. 7 is a diagram illustrating a message display section.

FIG. 7 illustrates the message display section 1461 displaying the content of a chat held by such operations according to the present exemplary embodiment. Suppose that the participant A wants to share a document file with the participant B in the form of a print output during a text chat. The participant A initially checks the printer icons included in the display section 147 on the screen illustrated in FIG. 4 to see that the printer 220 on the client terminal of the participant B is capable of performing printing and permitted to perform printing.

FIG. 8 illustrates the display section 147 according to the present exemplary embodiment. If a usable printer is connected to a personal computer, a printer icon is displayed as printer information. On the other hand, if a usable printer is not connected, the printer icon is hidden or grayed out. If a usable printer is connected to a personal computer but set to prohibit printing (muted), a crossed-out printer icon is displayed as the printer information. The data itself on the printer icons is managed by the client application, and the client application controls display of the printer icons based on information from the web conference application 310. The example of FIG. 8 indicates that the printers of the participants A and B are capable of performing printing and permitted to perform printing. The example also indicates that the printer of a participant C is not capable of performing printing, and the printer of a participant D is connected but not permitted to perform printing (muted). The participants can thus find out that the printer of the participant B is capable of performing printing and not prohibited from printing.

Next, the participant A selects information data to be shared with the participant B. In the following description, the information data to be shared is a digital file, more specifically a document file, stored in the HDD 202 of the personal computer 110 of the participant A. On the screen illustrated in FIG. 4, the participant A presses the print data selection button 1463 in the chat operation section to select print data on the client application 140. This opens a file selection window (file selection dialog 160). FIG. 6 illustrates the file selection window. The file selection window displays a list of user files stored in the HDD 202 of the personal computer 110. If a directory where a desired document file is stored is selected by the participant A, the client application 140 accesses the directory. The participant A can set the document file that the participant A wants the participant B to print by selecting the document file and pressing the open button. The directory list and the file selection may be implemented by the OS instructed by the client application 140.

After the document file is selected by the foregoing procedure, the participant A presses the transmission button 1465 illustrated in FIG. 4. In response, the client application 140 of the participant A transmits the selected document file and a print instruction to the client application 240 of the participant B via the web conference server 300. The client application 240 receiving the document file and the print instruction passes the data in the document file to the printer driver. The printer driver converts the data into print data, whereby the printer 220 is caused to perform printing. The client application 240 receiving the print instruction can receive a print completion notification from the printer 220, and delete the document file in response to the print completion notification. This enables the destination personal computer 210 to print the document file while preventing the document file from being stored as a file. The document file can thus be prevented from tampering or leakage, unlike the case where the document file is transmitted by an email, for example.

Information indicating the transmission of the print data from the participant A to the participant B is transmitted from the client application 140 of the participant A to the web conference application 310. The web conference application 310 then issues notifications to the client applications 140 and 240 of the participants A and B. As a result, a message about the transmission of the print data like a notification 1470 in FIG. 7 is displayed.

(Processing in Receiving Print Data from Participant)

Next, the behavior of the information processing system 200 of the participant B in the present exemplary embodiment will be described. If the foregoing chat session of the participant A with the participant B is started, the client application 240 of the participant B similarly displays a chat session window with the participant A. Using the chat session window, the participant B can make a print output to the participant A in addition to a text chat and file transmission. If the foregoing file selection and file transmission operations are made by the participant A, the print data is transmitted from the personal computer 110 to the client application 240 of the personal computer 210 via the web conference server 300. The chat window 1461 of the client application 240 of the participant B displays a chat message notifying that the print data is transmitted from the participant A. The client application 240 inputs the print data received from the web conference server 300 into the printer driver of the printer (for example, printer 220) set to be used for printing on the pulldown menu 153. The printer driver causes the printer 220 to perform printing via the OS. If the printing is normally completed, the printer 220 issues a print completion notification to the client application 240. The client application 240 then notifies the web conference application 310 of the completion of the printing. As a result, the web conference application 310 notifies the client application 140 of the participant A and the client application 240 of the participant B of the normal completion of the printing as illustrated by a notification 1467 in FIG. 7.

(Processing in Transmitting Print Data to Plurality of Participants or all Participants)

The foregoing description has dealt with the case where one participant participating in the web conference transmits print data to another participant. However, this is not restrictive. A plurality of participants selected from the list of conference participants illustrated in FIG. 4 or all the participants can chat on the chat system included in the web conference system. Furthermore, print data can be transmitted and print instructions can be given to the plurality of participants selected or all the participants as well.

With a chat session between a plurality of participants or all the participants started, a file can be transmitted by the procedure described above (processing in transmitting print data to a participant's printer). In the case of the chat session between a plurality of participants, the transmitted data is printed by a printer or printers that is/are connected and capable of performing printing (printing is not muted by printer settings) among the target participants' printers. In the case of the chat session between all the participants, the transmitted data is printed by all the participants' printers except one(s) not connected and one(s) connected but not permitted to make an output (muted).

(Processing in Transmitting Scanned Image of Paper Medium to a Participant or All Participants)

Operations for transmitting and receiving a scanned image of a paper medium between participants of the web conference will be described below. Specifically, a description will be given of an example case where the participant A participating in a web conference using the information processing system 100 shares information on a paper medium at hand with the participant B participating in the web conference in the form of a printed paper medium during the web conference.

Examples of the case where a participant wants to share information on a paper medium include a case of sharing non-digitized information such as a handwritten memo and a free-hand sketch, and a case of sharing information on a paper medium that is a printed drawing on which comments and corrections are handwritten. An operation procedure to be performed when the participant A wants to share a free-hand sketch with the participant B will be described.

Operations by the participant A will initially be described. The client application 140 of the personal computer 110 displays the operation screen 146. The operation screen 146 is intended to transmit and receive text messages and files, transmit and receive scanned images, and transmit and receive print data between participants in a web conference. The display section 147 displays the statuses of printers used for mutual printing in the web conference system. The display section 147 displays the states of the printers connected to the client applications of the respective conference participants. If the participant A selects the participant B from the list of participants and presses the participant B on the list, a chat session between the participants A and B is opened and the chat window 1461 is displayed to both the participants A and B. In addition to a text chat and file transmission, the participant A can make a print output to the participant B, and the participant B to the participant A, by operating the print data selection button 1463 and the transmission button 1465.

Figure 9:
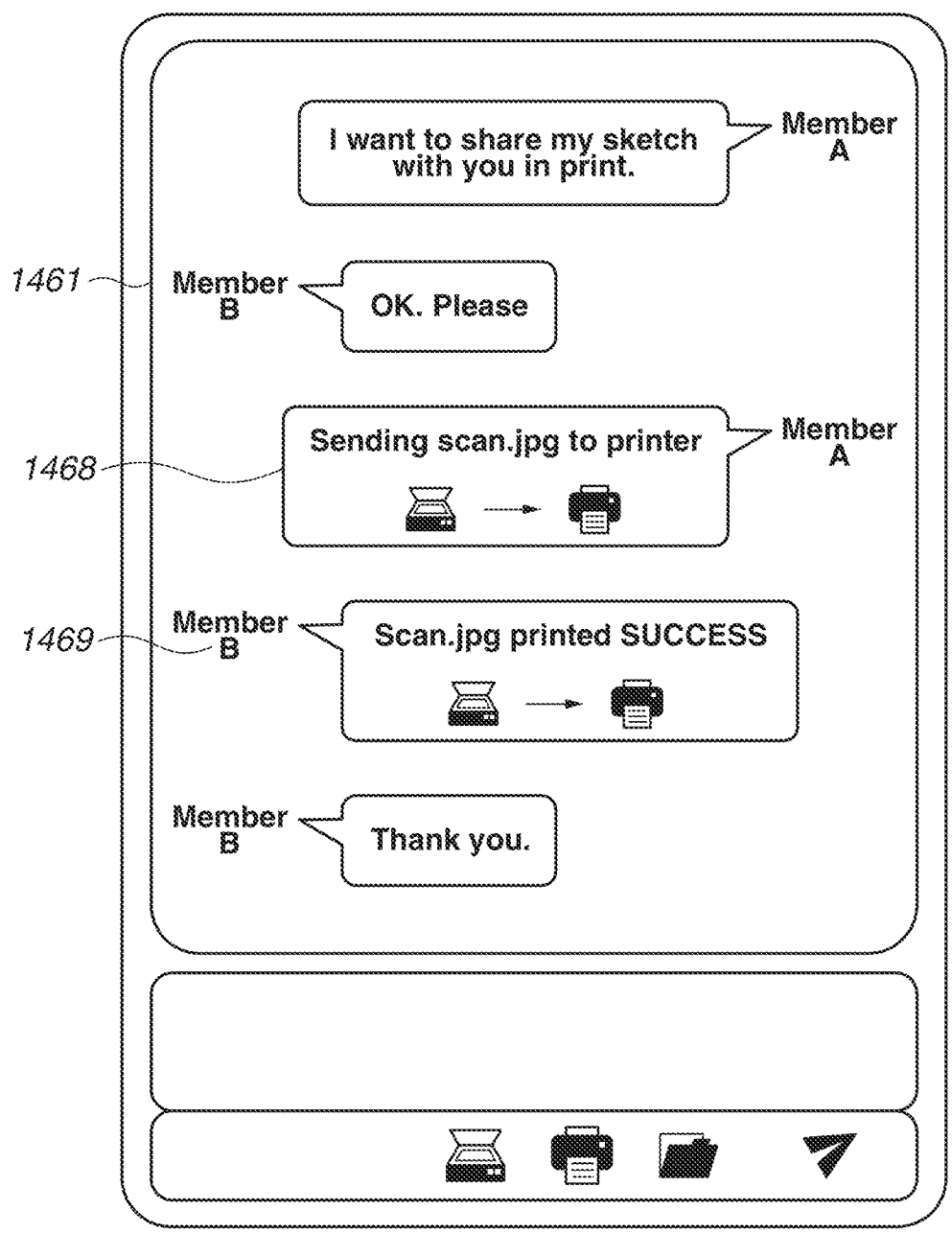
FIG. 9 is a diagram illustrating a chat window displaying chat contents.

FIG. 9 illustrating the chat window 1461 when the scanner 130 of the participant A scans a document and the printer 220 of the participant B performs printing. Suppose that the participant A wants to share a free-hand sketch that the participant A possesses in the form of a paper medium with the participant B in the form of a print output during the text chat. The participant A initially checks the display section 147 of FIG. 4 to see that the printer 220 of the participant B is capable of performing printing and permitted to perform printing. FIG. 8 illustrates the display section 147 according to the present exemplary embodiment. In this example, the printers 120 and 220 of the participants A and B are capable of performing printing and permitted to perform printing. The printer of the participant C is not capable of performing printing. The printer of the participant D is connected but not permitted to perform printing (muted). The participant A can thus find out from the display section 147 that the printer of the participant B is capable of performing printing and permitted to perform printing.

Figure 10:
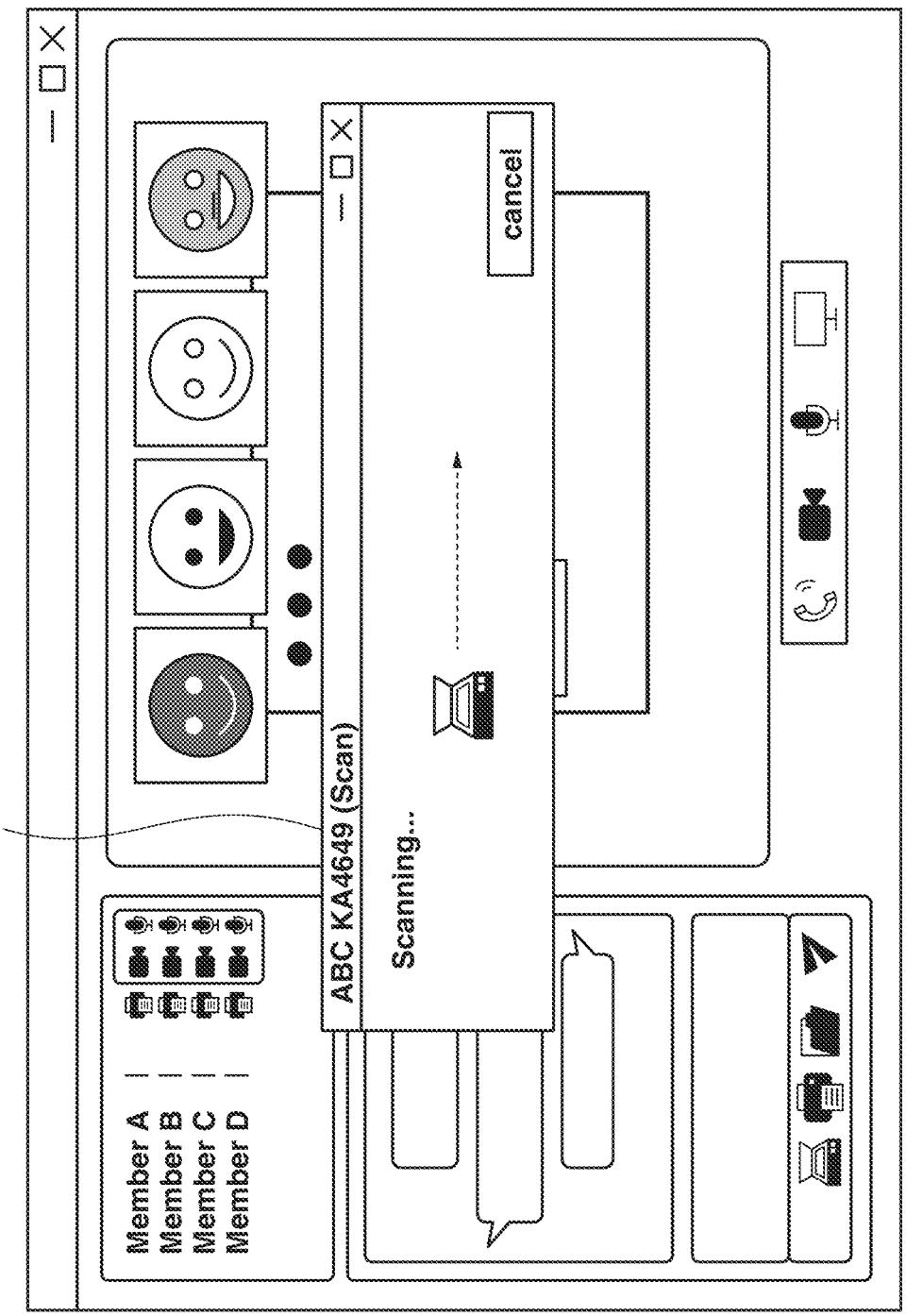
FIG. 10 is a diagram illustrating a dialog box notifying that reading is in process.

Next, the participant A converts the information data to be shared with the participant B into digital data by using the scanner apparatus. In this description, the data to be shared is a free-hand sketch drawn on a sheet that the participant A has at hand. To convert the free-hand sketch into a digital file on the client application 140 using the scanner apparatus, the participant A sets the document on a document platen of the corresponding scanner 130. The participant A then presses the icon button 1464 illustrated in FIG. 4 for capturing a scanned image. The client application 140 issues a read request to the scanner driver corresponding to the scanner apparatus (scanner 130) set on the scanner selection menu 154 illustrated in FIG. 5 in advance, based on a predetermined method of the OS. Upon receiving the read request, the scanner driver causes the scanner 130 to perform a document reading operation. Here, the client application 140 receives status information indicating that the reading is in process from the scanner 130. Based on the status information, the client application 140 displays a dialog box 170 notifying that the reading is in process as illustrated in FIG. 10.

After the reading of the free-hand sketch, or document, is completed by the foregoing procedure, the participant A presses the transmission button 1465. In response, the client application 140 transmits the scanned image of the read document and a print instruction to the client application 240 of the participant B via the web conference server 300. The client application 240 causes the printer 220 to print the scanned image in response to the reception of the scanned image and the print instruction. As illustrated by a chat message 1468 in FIG. 9, the transmission of the scanned data to the participant B as print data is notified to the participants A and B. As illustrated by a chat message 1469 in FIG. 9, the completion of the printing by the printer 220 of the participant B is also notified to the participants A and B. Like the notifications 1470 and 1467 of FIG. 7, the notifications (chat messages) 1468 and 1469 are issued by the web conference application 310 based on the information from the client applications 140 and 240. Specifically, the client application 140 automatically notifies the web conference application 310 of the message in response to the start of transmission of the scanned image. The client application 240 notifies the web conference application 310 of the message in response to the completion of the printing. The notifications (chat messages) 1468 and 1469 are reflected on the chat windows 1461 of both the participants A and B.

(Processing in Receiving Print Data from Participant)

Next, the behavior of the information processing system 200 of the participant B according to the present exemplary embodiment will be described. When the foregoing chat session of the participant A with the participant B is started, the chat session window with the participant A is similarly displayed on the client application 240 of the participant B. The participant B can make a print output to the participant A in addition to a text chat and file transmission by using the window. In such a state, the participant A operates the icon button 1464 illustrated in FIG. 4 to issue a scan instruction. The scanner 130 connected to the personal computer 110 operated by the participant A then scans a document. If the transmission button 1465 is operated, the scanned image is transmitted from the personal computer 110 of the participant A to the web conference server 300. The web conference server 300 then transmits the scanned image serving as print data and a print instruction to the client application 240 of the information processing system 200. The chat message 1468 notifying that the scanned image is transmitted as print data from the participant A is then displayed on the chat window 1461 of the client application 240 of the participant B. The client application 240 inputs the print data received from the web conference server 300 into the printer driver of the printer 220 set as the target printer in advance as described above. The printer driver causes the printer 220 to make a print output via the OS. If the printing is normally completed, the information processing system 200 issues a text notification that the printing of the print data is normally completed to the participant A such that the chat message 1469 of FIG. 9 is displayed.

(Processing in Transmitting Scanned Image to Printers of Plurality of Participants or all Participants)

The foregoing description has dealt with the case where a participant participating in the web conference shares information with another participant in the form of a printed paper medium. The chat system included in the web conference system is configured so that a plurality of participants selected from the list of conference participants or all the participants can chat with each other. Similarly, in the present exemplary embodiment, data obtained by scanning a paper medium can be distributed by printing to the plurality of participants or to all the participants. With a chat session between the plurality of participants or between all the participants started, document read data is transmitted by the procedure described above (processing in transmitting print data to the printer of a participant). As a result, in the case of the chat session between the plurality of participants, the transmitted data is output by printing from a printer or printers that is/are connected and capable of performing printing among the printers of the target participants. In the case of the chat session between all the participants, the transmitted data is output by printing from all the participants' printers except one(s) not connected and one(s) connected but not permitted to make an output (muted). In the present case, as illustrated in FIG. 6, the printer of the participant B is capable of performing printing and permitted to perform printing. The scanned image transmitted from the participant A is thus output by printing. Meanwhile, the printer of the participant C is not capable of performing printing, and the printer of the participant D is connected but not permitted to perform printing (muted). In such a case, the behavior in information sharing with the participants C and D depends on the setting of the checkbox 158 on the input/output device setting screen 150 of the client application 140 of the participant A. If the participant A checks the checkbox 158 to prohibit sharing of a scanned image other than by print output, the data is not transmitted to the participant C or D for information sharing.

By contrast, suppose that the participant A unchecks the checkbox 158 to permit sharing of a scanned image other than by print output. In such a case, no print output is made to the participants C and D, but the information about the scanned image is shared by file data transmission.

Figure 15A:
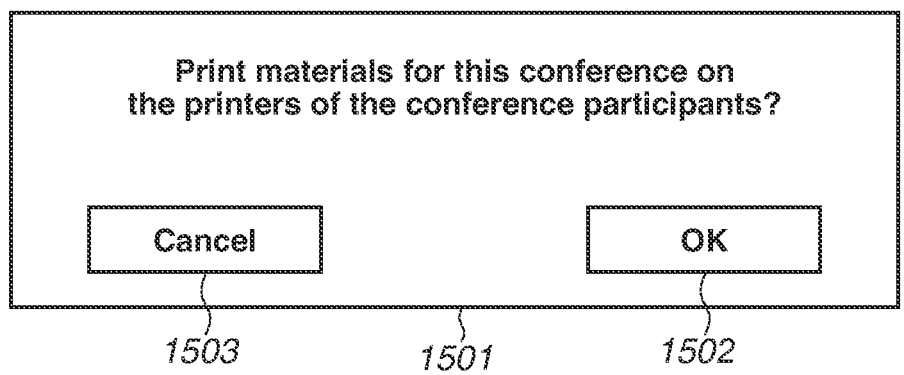
FIGS. 15A and 15B are diagrams illustrating message dialogs displayed by the application 140.
Figure 15B:
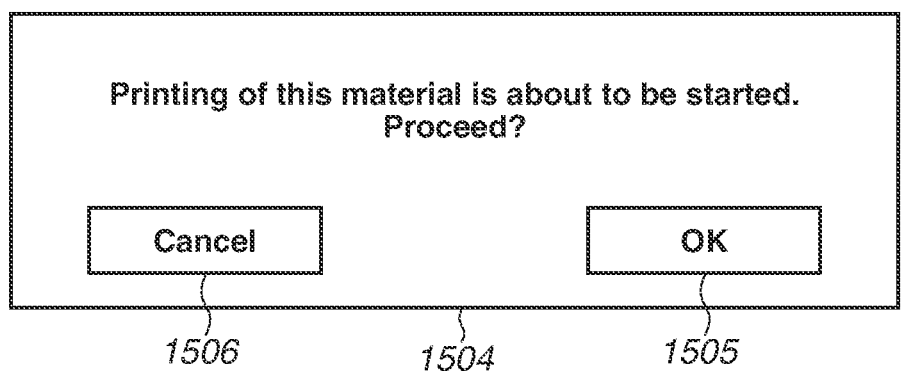

FIGS. 15A and 15B illustrate message dialogs displayed by the application 140. In FIG. 15A, a message dialog 1501 displays a message "Print materials for this conference on the printers of the conference participants?". The message dialog 1501 includes an OK button 1502 and a cancel button 1503. In FIG. 15B, a message dialog 1504 displays a message "Printing of this material is about to be started. Proceed?". The message dialog 1504 includes an OK button 1505 and a cancel button 1506. The message of FIG. 5A is displayed by the client application 140 that transmits the print data before the transmission. For example, the message of FIG. 5A is displayed when the transmission button 1465 is pressed after the selection of the file to be printed. If the OK button 1502 is pressed here, the transmission is started. The message of FIG. 5B is displayed by the client application 240 that receives the print data before the printing of the print data. If the OK button 1505 is pressed here, the printing is started.

Figure 11:
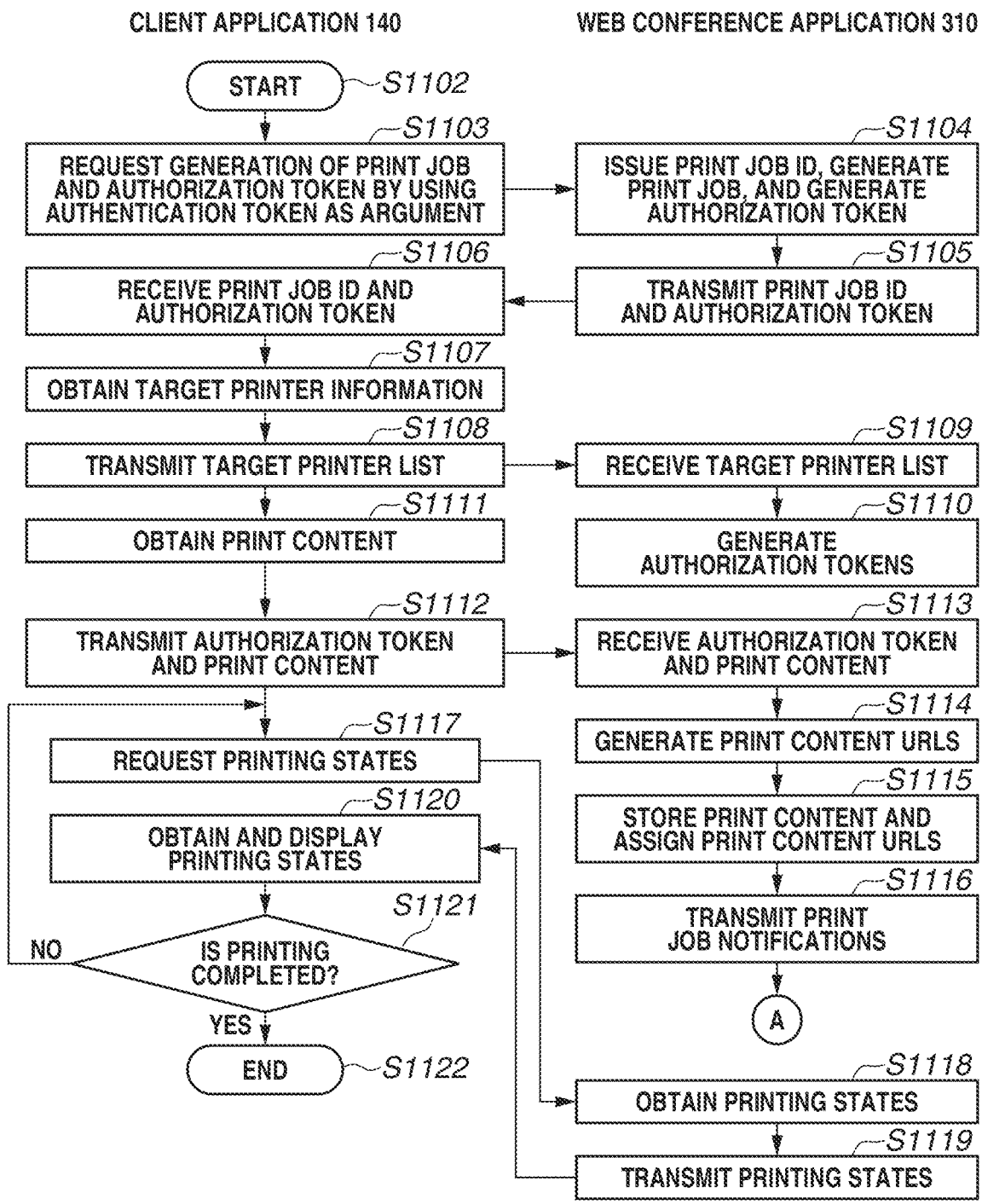
FIG. 11 is a flowchart illustrating print processing by an application 140.
Figure 12:
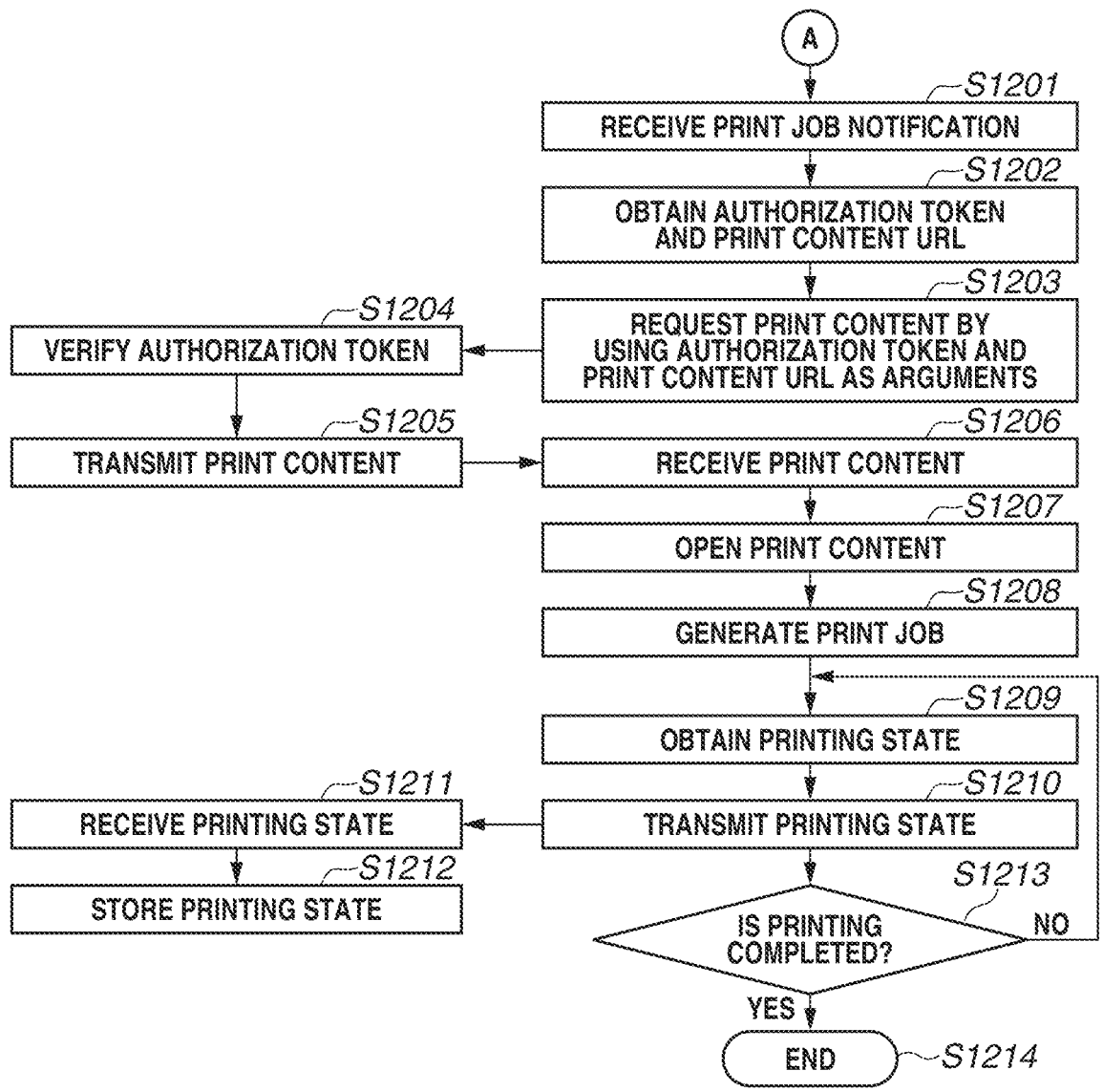
FIG. 12 is a flowchart illustrating print processing by an application 240.

FIG. 11 is a flowchart illustrating print processing by the application 140. FIG. 12 is a flowchart illustrating print processing by the application 240. Programs related to the flowcharts of FIGS. 11 and 12 are executed by the personal computers 110 and 210 of the information processing systems 100 and 200, respectively. For example, the programs are stored in the HDDs 202 of the respective personal computers 110 and 210, read into the RAMs 201, and executed by the CPUs 204. Similarly, the web conference server 300 performs the processing illustrated in FIGS. 11 and 12 by one or a plurality of processors executing the web conference application 310. In the following description, the client application 140, the client application 240, and the web conference application 310 will be described as the subjects executing the processing.

If the participant A presses the transmission button 1465, then in step S1102, the client application 140 starts the processing based on the flowchart of FIG. 11. In step S1103, the client application 140 requests generation of a print job and an authorization token from the web conference application 310 by using an authentication token as an argument. In step S1104, the web conference application 310 issues a print job ID, generates a print job, and generates an authorization token. In step S1105, the web conference application 310 transmits the print job ID and the authorization token to the client application 140. In step S1106, the client application 140 receives the print job ID and the authorization token, and stores the print job ID and the authorization token into the RAM 201 or the HDD 202. In step S1107, the client application 140 obtains target printer information indicating the states of the printers connected to the client applications of the respective conference participants, which is displayed in the display section 147. The target printer information includes information indicating whether there is a printable printer in each participant's information processing system, and information indicating the state of the print mute setting of the client application corresponding to each printer. In step S1107, the printer information received from the web conference application 310 in advance of the execution of the processing illustrated in FIG. 11 and displayed as printer icons as described with reference to FIG. 8 is obtained as the target printer information. However, this is not restrictive, and the latest printer information about the target printers may be obtained from the web conference application 310 in step S1107. In step S1107, printer information including information indicating the participants or the client applications is also obtained as the target printer information.

In step S1108, the application 140 generates a target printer list indicating the target printers from the target printer information obtained in step S1107, and transmits the target printer list to the web conference application 310. In generating the target printer list, the client application 140 checks the states of the print mute settings indicated by the target printer list, and excludes a printer or printers not permitted to perform printing (muted) from the target printers in the target printer list. The target printer list also includes information indicating the participants or client applications that is included in the target printer information.

In step S1109, the web conference application 310 receives the target printer list. In step S1110, the web conference application 310 generates authorization tokens for the respective target printers in the target printer list, and assigns the authorization tokens to the respective target printers. Specifically, the web conference application 310 identifies the client applications connectable to printers permitted to perform printing in the information processing systems based on the participants or client applications indicated by the target printer list. The web conference application 310 then assigns the authorization tokens to the client applications.

In step S1111, the client application 140 obtains print content, i.e., the file (such as a document file) selected by the participant A in the file selection dialog 160. In step S1112, the client application 140 transmits the authorization token stored in step S1106 and the print content obtained in step S1111 to the web conference application 310. In step S1113, the web conference application 310 receives the authorization token and the print content. In step S1114, the web conference application 310 generates as many Universal Resource Locators (URLs; hereinafter, also referred to as print content URLs) for distributing the print content as the number of target printers to which the authorization tokens are assigned in step S1110. In step S1115, the web conference application 310 stores the print content into the file storage 340 and assigns the URLs thereto. In step S1116, the web conference application 310 transmits print job notifications to the client applications to which the target printers are connected, such as the application 240. The processing proceeds to A. Each print job notification includes an authorization token and a print content URL. The authorization token is the one assigned in step S1110 to the client application to which the print job notification is transmitted. The print content URL is location information indicating the location of the print contents.

In step S1117, the client application 140 requests printing states from the web conference application 310. In step S1118, the web conference application 310 obtains the printing states of the target printers from the respective client applications such as the client application 240. In step S1119, the web conference application 310 transmits the printing states to the client application 140.

In step S1120, the application 140 obtains the printing states of the respective target printers, and displays the printing states in the message display section 1461 as illustrated in FIG. 7. In step S1121, the application 140 checks whether the printing is completed in all the target printers. If the printing is determined to be completed in all the target printers (YES in step S1121), the processing proceeds to step S1122. If there is determined to be a target printer not having completed printing (NO in step S1121), the processing returns to step S1117. In step S1122, the client application 140 ends the print processing.

In step S1112, the client application 140 may transmit information indicating the participant(s) selected by the user on the screen illustrated in FIG. 4 to the web conference application 310 along with the authorization tokens and the print content. In step S1116, the web conference application 310 may transmit the print job notification(s) to the client application(s) of the participant(s) indicated by the information. In such a manner, printing is performed by only the participant(s) selected by the user of the client application 140.

If the processing of FIG. 11 proceeds to A, the processing illustrated in FIG. 12 is performed. The client application 240 performs the processing based on the flowchart of FIG. 12, starting at A. In step S1201, the client application 240 receives the print job notification. In step S1202, the client application 240 obtains the authorization token and the print content URL included in the print job notification. In step S1203, the client application 240 requests print content from the web conference server 300 by using the authorization token and the print content URL as arguments. In step S1204, the web conference application 310 verifies the authorization token. If the authorization token is determined to be valid, the processing proceeds to step S1205. If the authorization token is determined to be invalid, the web conference application 310 returns an error to the client application 240 (not illustrated). Upon receiving the error, the client application 240 displays an error message "The reception of the print content failed". The processing proceeds to step S1214, and the print processing ends.

In step S1205, the web conference application 310 transmits the print content to the client application 240. In step S1206, the client application 240 receives the print content. In step S1207, the client application 240 activates an application (not illustrated) associated with the file format of the received print content and opens the print content. In step S1208, the client application 240 requests the OS to generate a print job, and the OS generates the print job. The OS transmits the print job to the printer 220. Upon receiving the print job, the printer 220 starts printing.

More specifically, in step S1208, the client application 240 performs print control to cause the printer 220 to print the print content received in step S1206. The print control by the client application 240 in step S1208 can be performed by various methods. As an example, the application (not illustrated) activated by the client application 240 automatically instructs the printer driver to print the foregoing file (print content) and transmits the print job for the file to the printer 220 via the printer driver and the OS. Upon receiving the print job, the printer 220 prints the data in the file. In such a case, the application activated as described above is capable of generating a file of the same file format as the foregoing file.

As another example, the client application 240 may activate a standard print application that comes with the OS, and notifies the print application of the file path of the file to be printed. The print application may then read the file based on the notified file path and transmit the file to the printer 220 via the OS as a file to be printed. Upon receiving the file, the printer 220 prints the data in the file. The print application may transmit the file without the intervention of the printer driver, and the processing for converting the data in the file into print data may be performed by the printer 220.

In step S1209, the client application 240 obtains the printing state of the printer 220 via the OS. In step S1210, the client application 240 transmits the printing state to the web conference application 310. The processing proceeds to step S1213. Possible printing states to be transmitted here include "online", "offline", "printing", "print completed", and "print cancelled". The possible printing states also include "out of paper error", "paper jam error", "low ink level warning", "out of ink error", "communication error", and "other errors". In step S1211, the web conference application 310 receives the printing state. In step S1212, the web conference application 310 stores the printing state into the database 330. Possible printing states to be stored here include "online", "offline", "printing", "print completed", "print cancelled", "out of paper error", "paper jam error", "low ink level warning", "out of ink error", "communication error", and "other errors". Such information is stored into the database 330. The printing state stored in the database 330 in step S1212 is transmitted in step S1119.

In step S1213, the client application 240 determines whether the printing is completed. If the printing is determined to be completed (YES in step S1213), the processing proceeds to step S1214. If the printing is determined to be not completed (NO in step S1213), the processing returns to step S1209. In step S1214, the client application 240 ends the print processing.

If, in step S1213, the printing is determined to be completed, the client application 240 may delete the print content received in step S1206. Alternatively, the client application 240 may delete the print content if the printing is not determined to be completed for a predetermined time in step S1213. The print content can thereby be prevented from remaining in the information processing system 200 if the printing is completed or if the printing is failed. This can reduce the risks of generation of tampered data on the personal computer 210 of the information processing system 200 and unintended leakage of information from the information processing system 200 to outside.

Figure 13:
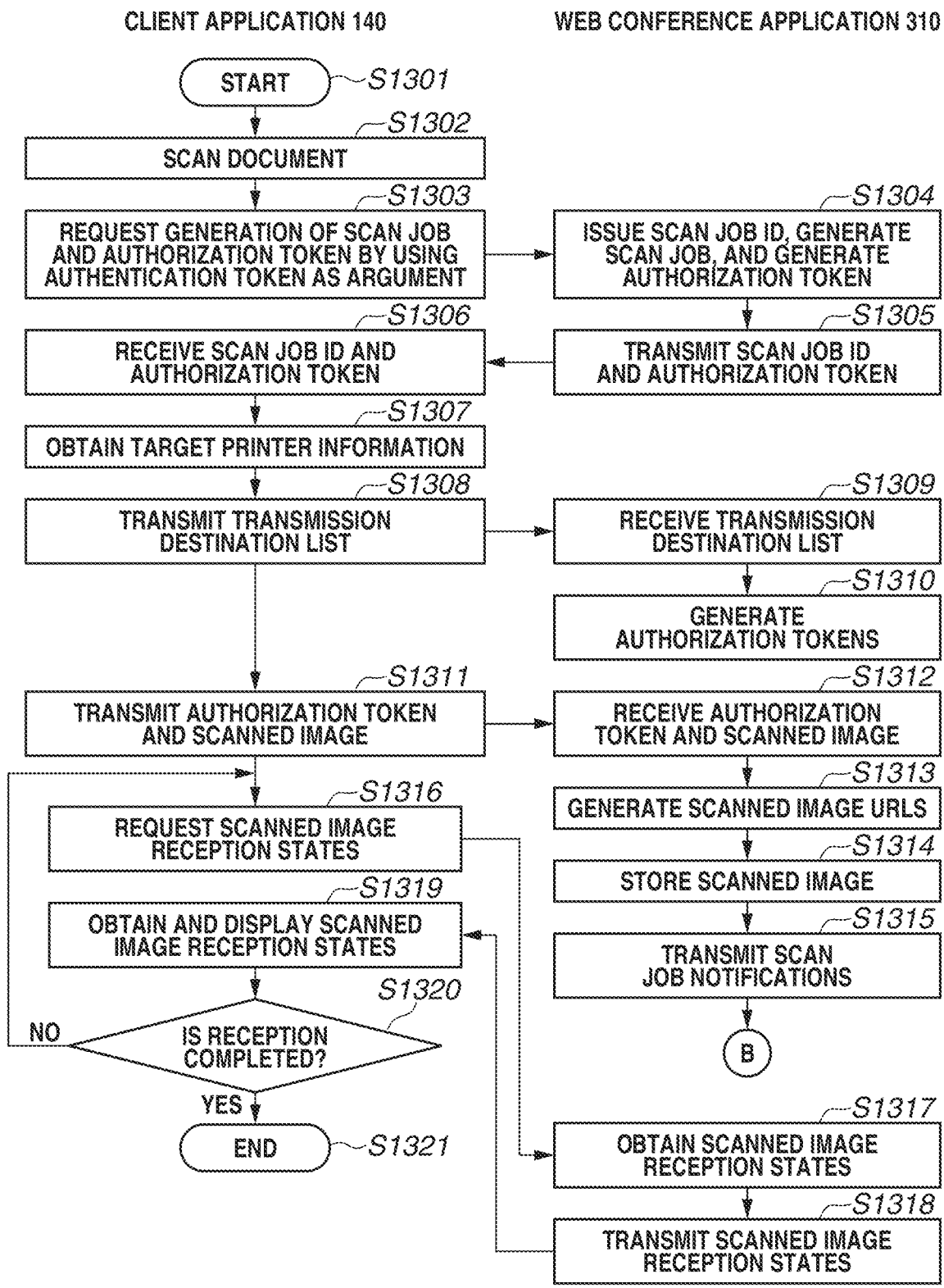
FIG. 13 is a flowchart illustrating scan processing by the application 140.
Figure 14:
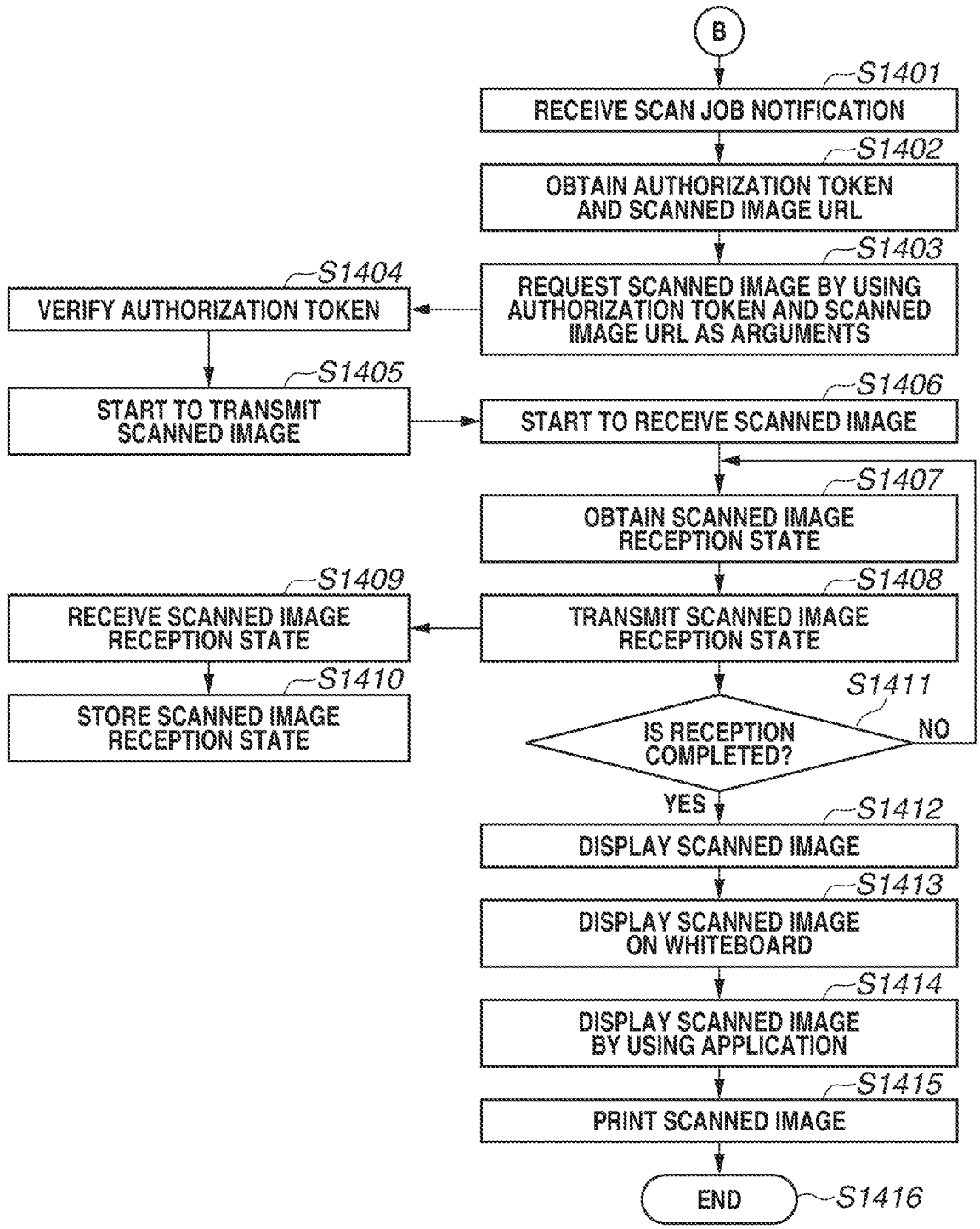
FIG. 14 is a flowchart illustrating scan processing by the application 240.

FIG. 13 is a flowchart illustrating scan processing by the application 140. FIG. 14 is a flowchart illustrating scan processing by the application 240. Programs related to the flowcharts of FIGS. 13 and 14 are executed by the personal computers 110 and 210 of the information processing systems 100 and 200, respectively. For example, the programs are stored in the respective HDDs 202 of the personal computers 110 and 210, read into the RAMs 201, and executed by the CPUs 204. Similarly, the web conference server 300 performs the processing illustrated in FIGS. 13 and 14 by one or a plurality of processors executing the web conference application 310. In the following description, the client application 140, the client application 240, and the web conference application 310 will be described as the subjects executing the processing.

If the participant A presses the icon button 1464 of FIG. 4, the client application 140 performs processing based on the flowchart of FIG. 13, starting at step S1301. In step S1302, the client application 140 performs reading control to cause the scanner 130 to scan a document and capture a scanned image. If the capturing of the scanned image is completed, the client application 140 stores the scanned image into the RAM 201 or the HDD 202. The reading control by the client application 140 in step S1302 can be performed by various methods. For example, the client application 140 issues a scan instruction to the scanner driver corresponding to the scanner 130, and the scanner driver issues a scan command to the scanner 130. Alternatively, the client application 140 may issue a scan instruction to a standard scan application that comes with the OS, and the scan application may issue a scan command to the scanner 130. The processing of step S1303 and the subsequent steps may be automatically performed in response to the storage of the scanned image in step S1302, or in response to the pressing of the transmission button 1465 of FIG. 4 after the scanned image is stored in step S1302. In step S1303, i.e., after the scanned image is stored in step S1302, the user operates the client application 140 to request generation of a scan job and an authorization token from the web conference application 310 by using an authentication token as an argument. In step S1304, the web conference application 310 issues a scan job ID, generates a scan job, and generates an authorization token. In step S1305, the web conference application 310 transmits the scan job ID and the authorization token to the client application 140. In step S1306, the client application 140 receives the scan job ID and the authorization token, and stores the scan job ID and the authorization token into the RAM 201 or the HDD 202.

In step S1307, the client application 140 obtains the target printer information as in step S1107.

In step S1308, the client application 140 generates a transmission destination list indicating the transmission destinations of the scanned image from the target printer information obtained in step S1307, and transmits the transmission destination list to the web conference application 310. Here, the transmission destination list includes two lists of transmission destinations of the scanned image. The first list is one not involving printing on printers, and includes information about all the conference participants' client applications. The second list is one involving printing on printers. The second list is obtained by excluding client applications to which no printable printer is connected and client applications to which a printer not permitted to perform printing (muted) is connected from the foregoing first list. The second list is generated based on the states of the printers indicated by the target printer information.

In step S1309, the web conference application 310 receives the transmission destination list. In step S1310, the web conference application 310 generates authorization tokens for the respective participants' client applications in the transmission destination list and assigns the authorization tokens to the respective client applications by processing similar to that of step S1110. In step S1311, the application 140 transmits the authorization token stored in step S1306 and the scanned image stored in step S1302 to the web conference application 310. In step S1312, the web conference application 310 receives the authorization token and the scanned image. In step S1313, the web conference application 310 generates as many URLs (scanned image URLs) for distributing the scanned image as the number of transmission destination client applications. In step S1314, the web conference server 300 stores the scanned image into the file storage 340, and assigns the URLs thereto. In step S1315, the web conference application 310 transmits scan job notifications to the transmission destination client applications such as the application 240. The processing proceeds to B. Each scan job notification includes the authorization token and a scanned image URL that is location information indicating the location of the scanned image. In steps S1311 and S1315, like the method described above in conjunction with steps S1112 and S1116, the web conference application 310 may transmit the scan job notification(s) to only the client application(s) of the participant(s) selected by the user on the client application 140.

In step S1316, the application 140 requests scanned image reception states from the web conference application 310. In step S1317, the web conference application 310 obtains scanned image reception states from the respective client application such as the application 240. In step S1318, the web conference application 310 transmits the scanned image reception states to the application 140. In step S1319, the client application 140 obtains the scanned image reception states of the respective client applications such as the client application 240, and displays the scanned image reception states in the message display section 1461 as illustrated in FIG. 9. In step S1320, the client application 140 checks whether the reception of the scanned image is completed by all the client applications set as the transmission destinations of the scanned image. If the reception of the scanned image is determined to be completed in all the client applications (YES in step S1320), the processing proceeds to step S1321. If there is determined to be a client application in which the reception is not completed (NO in step S1320), the processing returns to step S1316. In step S1321, the application 140 ends the scan processing.

In step S1401 of FIG. 14, the client application 240 receives the scan job notification. In step S1402, the client application 240 obtains the authorization token and the scanned image URL included in the scan job notification. In step S1403, the client application 240 requests the scanned image from the web conference application 310 by using the authorization toke and the scanned image URL as arguments. In step S1404, the web conference application 310 verifies the authorization token. If the authorization token is determined to be valid, the processing proceeds to step S1405. On the other hand, if the authorization token is determined to be invalid, the web conference application 310 returns an error to the application 240 (not illustrated). Upon receiving the error, the client application 240 displays an error message "The reception of the scanned image failed", and ends the processing illustrated in FIG. 14.

In step S1405, the web conference application 310 starts to transmit the scanned image to the client application 240. In step S1406, the client application 240 starts to receive the scanned image. In step S1407, the client application 240 obtains its scanned image reception state. In step S1408, the client application 240 transmits the scanned image reception state to the web conference application 310. Possible scanned image reception states to be transmitted here include "standby", "receiving image", "image reception completed", "image reception cancelled", "image reception error", "communication error" and "other errors". In step S1409, the web conference application 310 receives the scanned image reception state. In step S1410, the web conference application 310 stores the scanned image reception state into the database 330. Possible scanned image reception states to be stored here include "standby", "receiving image", "image reception completed", "image reception cancelled", "image reception error", "communication error", and "other errors". Such information is stored into the database 330. The information stored in step S1410 is used in step S1317.

In step S1411, the client application 240 determines whether the reception of the scanned image is completed. If the reception is determined to be completed (YES in step S1411), the processing proceeds to step S1412. If the reception is determined to not be completed (NO in step S1411), the processing returns to step S1407. In step S1412, the client application 240 displays the scanned image. In step S1413, the client application 240 displays the scanned image on a whiteboard in the application 240. Information displayed on the whiteboard is also displayed on the whiteboards in the client applications of the other participants participating in this web conference via the web conference application 310. In step S1414, the application 240 activates an application (not illustrated) associated with the file format of the scanned image (such as a Joint Photographic Experts Group (JPEG) file and a Portable Document Format (PDF) file), and displays the scanned image on the activated application.

In step S1415, the client application 240 performs print control similar to that of steps S1207 and S1208 in FIG. 12 to request the OS to generate a print job, and the OS generates the print job. The OS transmits the print job to the printer 220. Upon receiving the print job, the printer 220 starts printing. The scanned image is thereby printed by the printer 220. In step S1415, like step S1208, the client application 240 can perform various types of print control. Examples of the types of print control include a method using the printer driver and a method using the standard print application that comes with the OS.

In step S1416, the application 240 ends the scan processing.

All the processing of steps S1412, S1413, S1414, and S1415 does not necessarily need to be performed. The processing of some of the steps may be performed in combination, and the processing of each step may be singly performed, depending on the participants' intentions. For example, the scanned image may be displayed in step S1414 without the processing of step S1413, and then printed in step S1415 when the user of the client application 240 gives the instruction.

In the web conference system according to the foregoing exemplary embodiment, the description is given of the example where the presenter's personal computer is displayed as a method for sharing materials on screen (desktop screen sharing). However, this is not restrictive. The file of the presentation data may be called and the data in the file may be displayed on the client terminal (personal computer) 210 of the information processing system 200, which is hereinafter referred to as file sharing. In such a case, the display control processing may be performed by the client application 140 or the web conference application 310. In the former case, the client application 140 performs the display control processing on the data and transmits the display data to the web conference application 310 in real time. The web conference application 310 then transmits the display data to the client application 240, and the client application 240 displays the display data. If the presenter changes the page to be displayed of the presentation material, the changed page is displayed in real time. In the latter case, the presenter using the information processing system 100 selects presentation data (such as a file) on the screen of the client application 140. The client application 140 reads the presentation data from the HDD 202 via the OS, and transmits the data (such as a file) and a display instruction to the web conference application 310. Upon receiving the data (such as a file) and the display instruction, the web conference application 310 generates display data from the file and transmits the display data to all the participants' client applications. In other words, the same file is displayed on all the participants' display screens by the display control by the web conference application 310. If the presenter using the information processing system 100 issues a page switch instruction or a presentation end instruction from the screen of the client application 140, the client application 140 transmits the instruction to the web conference application 310. Based on the instruction, the web conference application 310 performs page switch processing or display end processing on the data being displayed. In other words, the same content in the file (for example, the same page) is displayed on all the participants' display screens in real time by the display control by the web conference application 310.

In the foregoing exemplary embodiment, the file selected by the user on the screen illustrated in FIG. 6 serves as the print content. However, this is not restrictive, and the material specified by the presenter and currently shared on the screens of the participants' client applications may be automatically specified to be printed. Alternatively, only the currently displayed page among a plurality of pages of materials may be automatically specified to be printed. Suppose, for example, that the foregoing "file sharing" is being performed by the display control processing by the client application 140. In such a case, the client application 140 can identify the file path of the file currently displayed on the client applications by the file sharing and the page number of the page currently displayed. In step S1111 of FIG. 11, the client application 140 thus identifies the file being displayed based on the file path. In step S1112, the client application 140 reads the identified file and transmits the file to the web conference application 310 as print content. Alternatively, in step S1112, the client application 140 may identify the currently displayed page in the identified file and transmit only the page to the web conference application 310 as print content.

If the web conference application 310 performs the display control processing for file sharing, then in step S1111, the client application 140 receives the filename of the currently shared file from the web conference application 310. Alternatively, the client application 140 receives the file name and the page number of the currently displayed page in the file. The client application 140 then identifies the file being displayed from the filename, reads the file, and transmits the file or the page being displayed in the file to the web conference application 310. Alternatively, in step S1112, the client application 140 transmits a print instruction to print the entire material being displayed or the page being displayed to the web conference application 310. Since the web conference application 310 is performing the display control processing of the material, the web conference application 310 can identify the file of the material and the page being displayed. Upon receiving the print instruction, the web conference application 310, in step S1113, identifies the file being displayed or the page being displayed in the file. In step S1116, the web conference application 310 transmits a print job for the identified file or page.

Other Exemplary Embodiments

An exemplary embodiment of the present disclosure can also be implemented by processing for supplying a program for implementing one or more functions of the foregoing exemplary embodiment to a system or an apparatus via a network or a storage medium, and reading and executing the program by one or more processors in a computer of the system or apparatus. A circuit (such as an application specific integrated circuit (ASIC)) for implementing one or more functions may be used for implementation.

In the foregoing exemplary embodiment, the client application 140 transmits a print instruction to the client application 240 via the web conference application 310. In FIGS. 11 to 14, the URL of the print content is transmitted as the print instruction. However, this is not restrictive, and a print job including the print content may be transmitted to the client application 240 as the print instruction.

The print content may be stored in the web conference server 300 or another external server. In other words, the client applications may request the print content based on the notified URL from an external server other than the conference server 300 in response to the print instruction.

In the foregoing exemplary embodiment, the client terminal 210 transmits printer information to the web conference server 300, and the printer information is displayed on the client terminal 110 as illustrated in FIG. 8. The printer information includes both the information indicating whether a usable printer is connected to the client terminal 210 and the information about the settings of the printer (such as whether the print mute setting is made). However, this is not restrictive, and the printer information may include only one of the types of information. Alternatively, the printer information may also include printer statuses (remaining ink level, whether sheets are set in the printer, and the presence and absence of an error). The information indicating the printer statuses may be displayed on the screen illustrated in FIG. 8 by the client application 140 of the client terminal 110.

The configuration of the web conference system is not limited to that of the foregoing exemplary embodiment. For example, the web conference system may include web applications operable from the web browsers in the client terminals, instead of the client applications. Alternatively, the web conference system may include plugin software that can be built in the client applications.

In the foregoing exemplary embodiment, the information processing apparatuses are assumed to be personal computers. However, any type of information processing apparatus (terminal) that can be similarly used, such as a mobile phone, a portable information terminal, a digital still camera, a digital video camera, a portable music player, a game machine, a set-top box, and Internet home appliances, may be used.

In the foregoing exemplary embodiment, an OS equivalent to Windows® 10 is used as an example of the OS. However, the OS is not limited thereto, and any other OS may be used. In the foregoing exemplary embodiment, the Ethernet® is used as an example. However, this example is not restrictive. For example, any other network configuration such as a wireless LAN, the Institute of Electrical and Electronics Engineers (IEEE) 1394, and Bluetooth® may be used.

In the foregoing exemplary embodiment, the printer and scanner apparatuses are described as two independent apparatuses. However, this example is not restrictive. The printer and scanner apparatuses may be integrally configured as a multifunction printer.

In the foregoing exemplary embodiment, the description is given of the example where the personal computers are connected to the printers and the scanners vis USBs, and perform printing by using the printers and scanning by using the scanners. However, this example is not restrictive. For example, an exemplary embodiment of the present disclosure can also be implemented by a configuration where the printers directly receive print content via the Internet and print the print content and the scanners directly transmit scanned images via the Internet without the intervention of the personal computers.

In the foregoing exemplary embodiment, the description is given of the example where the client applications have the mute function of rejecting printing on the own printer as illustrated in the display section 147 of FIG. 8. However, this example is not restrictive. For example, when the own printer is offline, the client applications may reject printing in a state equivalent to when the mute function is on. Alternatively, the client application 140 may transmit content to the client application 240 via the web conference server 300 instead of associating the offline state with the mute function. If the printer 220 of the information processing system 200 is offline, the client application 240 may display a warning message (not illustrated), e.g., "The printer is offline. Please power on the printer.", to prompt printing. In such a case, the client applications may determine the online, offline, and mute states of the printers, and notify the web conference application 310 of the states. The client applications may display the online, offline, and mute states of the other participants' printers with respective different icons.

A web conference system with even higher operability can be provided by allowing for automatic printing of materials to be used in a web conference for a conference participant when the participant signs in to the web conference service and joins the web conference. As a specific example of such an exemplary embodiment, the client application 140 displays the message dialog 1501 of FIG. 15A to prompt printing of the materials to be used in the conference when participants join the conference. If the participant presses the OK button 1502, the print processing is started at step S1101 of FIG. 11 in a state where the materials for the conference are selected, whereby the materials are printed out by the participant's printer. If the participant presses the cancel button 1503, the materials are not printed out.

Now, suppose that a participant A of a conference prints out materials for the conference on the printers of the other participants participating in the conference. In such a case, a display-locking control for maintaining a display state may be performed to prevent the display of the materials (print content) in the window 143, which is being shared between the participants, from being switched or disappearing when a participant presses the transmission button 1465. The display-locking control is performed by the sender's client application if the client application performs the display processing. On the other hand, if the web conference application 310 performs the display processing, the display-locking control is performed by the web conference application 310.

The client application 140 may display the message dialog 1504 of FIG. 15B when the transmission button 1465 is pressed by the participant A. In this case, if the participant A presses the OK button 1505, the printer 120 performs the print processing. If the cancel button 1506 is pressed, the original display is restored without execution of the print processing by the printer 120.

Possible print content may include a list of conference participants, a chat log, minutes, a whiteboard screen, and web conference questionnaire results. For example, a web conference system with even higher operability can be provided by allowing for selection of such print content and printing of the print content on the participants' printers.

When a client application transmits a scanned image to other client applications, each client application that receives the scanned image may determine whether to print the scanned image. For example, a client application set to reject printing (muted) receives the scanned image and displays the scanned image. A client application permitted to perform printing receives the scanned image and requests the OS to generate a print job. A web conference system appropriately satisfying the participants' individual demands can thus be provided.

While the exemplary embodiments have been described in detail above, the present disclosure is not limited to the specific exemplary embodiments. Various changes and modifications may be made without departing from the gist of the present disclosure.

The effects of the respective exemplary embodiments can be further enhanced by combining the exemplary embodiments, and a web conference system with excellent user operability can thus be provided.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-124529, filed Jul. 21, 2020, which is hereby incorporated by reference herein in its entirety.

What is claimed is:

1. A web conference system comprising:
a server system including one or more server apparatuses configured to provide a web conference service;
a first apparatus including a first application for holding a web conference; and
a second apparatus including a second application for holding a web conference,
wherein the server system includes one or more memories storing instructions and one or more processors that, upon execution of the instructions configures the server system to operate as
an acceptance unit configured to accept participation requests for the web conference from the first and second applications, and
a first transmission unit configured to transmit voice data transmitted from the first application to the second application and transmit voice data transmitted from the second application to the first application based on the acceptance of the participation requests from the first and second applications by the acceptance unit,
wherein the second apparatus includes one or more memories storing instructions and one or more processors that, upon execution of the instructions configures the server system to operate as
a first output unit configured to output sound based on the voice data transmitted by the first transmission unit by using the second application, and
a second transmission unit configured to transmit, to the server system using the second application, first information indicating a connection status of a printer to the second apparatus and second information including a setting indicating whether a received print instruction should be executed by the printer connected to the second apparatus,
wherein the first apparatus includes one or more memories storing instructions and one or more processors that, upon execution of the instructions configures the server system to operate as
a second output unit configured to output sound based on the voice data transmitted by the first transmission unit using the first application,
a display control unit configured to display on a display screen, using the first application, content that is communicated via the server system and shared with the second apparatus, and
printer information about the printer connected to the second apparatus based on the first information and second information transmitted by the server system based on the acceptance of the participation requests from the first and second applications by the acceptance unit, and
a print instruction unit configured to communicate, to the server system, a print instruction to instruct the second apparatus to perform printing of the content shared using the first application,
wherein, the second application of the second apparatus displays the content shared from the first application via the server system and rejects the print instruction received from the server system when the second information indicates that the printer connected to the second apparatus is set to reject all print instructions.

2. The web conference system according to claim 1, wherein execution of the stored instructions by the one or more processors of the second apparatus further configures the second apparatus to operate as a print control unit configured to cause the printer to perform printing by using the second application based on a print instruction given by the print instruction unit.

3. The web conference system according to claim 2, wherein the second apparatus includes a printer driver, and
wherein the print control unit is configured to cause the printer to perform the printing via the printer driver based on the print instruction given by the print instruction unit.

4. The web conference system according to claim 2, wherein the print control unit is configured to request external content to be printed from an external server system based on the print instruction given by the print instruction unit, and to cause the printer to print the external content to be printed received in response to the request.

5. The web conference system according to claim 4, wherein the external server system is the server system configured to provide the web conference service.

6. The web conference system according to claim 4,
wherein location information indicating a location of the external content to be printed is transmitted to the second apparatus, and
wherein the print control unit is configured to request the content to be printed from the external server system based on the location information.

7. The web conference system according to claim 2, wherein execution of the stored instructions by the one or more processors of the first apparatus further configures the first apparatus to operate as
a reading control unit configured to cause a scanner to read a document by using the first application, and
a third transmission unit configured to transmit a scanned image to the server system, the scanned image being obtained by the reading control unit causing the scanner to read the document, and
wherein the print control unit is configured to cause the printer to print the scanned image transmitted by the third transmission unit.

8. The web conference system according to claim 2, wherein execution of the instructions by the one or more processors of the second apparatus further configures the print control unit of the second apparatus is configured to cause the printer to print data on a predetermined page included in the file based on display of the predetermined page by the second display control unit.

9. The web conference system according to claim 2,
wherein the second display control unit is included in the first apparatus,
wherein the first apparatus is configured to, using the second display control unit, display, based on acceptance of the participation requests from the first and second application, the data included a file stored in the first apparatus on the display screen and cause the second application to display the data by transmitting the data to the second application via the server system,
wherein the print instruction unit of the first apparatus is configured to issue a print instruction for the data included in the file based on display of the file by the second display control unit; and
wherein print control unit of the second apparatus is configured to cause the printer to print the file based on display of the data in the file by the second display control unit.

10. The web conference system according to claim 2,
wherein the second display control unit is included in the server system,
wherein the print instruction unit of the first apparatus is configured to transmit the file to the server system,
wherein the server system is configured to issue a print instruction for the data included in the file to the second apparatus based on display of the file by the second display control unit; and
wherein print control unit of the second apparatus is configured to cause the printer to print the file based on display of the data in the file by the second display control unit.

11. The web conference system according to claim 1, wherein the second application of the second apparatus displays the information shared from the first application via the server system and automatically prints the information based on the print instruction received from the server system when the second information indicates that the printer connected to the second apparatus is set in an automatic print mode.

12. A method of performing a web conference using a web conference system that includes a server system, a first apparatus, and a second apparatus, the server system including one or a plurality of server apparatuses configured to provide a web conference service, the first apparatus including a first application for holding a web conference, the second apparatus including a second application for holding a web conference, the processing method comprising:

accepting, by the server system, participation requests for the web conference from the first and second applications;
transmitting, by the server system, voice data transmitted from the first application to the second application and transmitting voice data transmitted from the second application to the first application based on the acceptance of the participation requests from the first and second applications;
outputting, by the second apparatus, sound based on the voice data transmitted by the server system using the second application;
outputting, by the first apparatus, sound based on the voice data transmitted by the server system by using the first application;
transmitting, by the second apparatus to the server system using the second application, first information and second information including a setting indicating whether a received print instruction should be executed by the printer connected to the second apparatus;
displaying, by the first apparatus on a display screen using the first application, content that is communicated via the server system and shared with the second apparatus, and printer information about the printer connected to the second apparatus based on the first information and second information transmitted by the server system based on the acceptance of the participation requests from the first and second applications;
communicating, to the server system by the first apparatus, a print instruction to instruct the second apparatus to perform printing of the content shared using the first application;
wherein, the second application of the second apparatus displays the content shared from the first application via the server system and rejects the print instruction received from the server system when the second information indicates that the printer connected to the second apparatus is set to reject all print instructions.

13. A server system including one or a plurality of server apparatuses configured to provide a web conference service and configured to communicate with a first apparatus including a first application for holding a web conference and a second apparatus including a second application for holding a web conference, the server system comprising one or more memories storing instructions and one or more processors that, upon execution of the instructions configures the server system to operate as:
an acceptance unit configured to accept participation requests for the web conference from the first and second applications; and
a first transmission unit configured to transmit voice data transmitted from the first application to the second application and transmit voice data transmitted from the second application to the first application based on the acceptance of the participation requests from the first and second applications by the acceptance unit,
wherein the second apparatus includes one or more memories storing instructions and one or more processors that, upon execution of the instructions configures the server system to operate as
a first output unit configured to output sound based on the voice data transmitted by the first transmission unit using the second application, and
a second transmission unit configured to transmit, to the server system using the second application, first information indicating a connection status of a printer to the second apparatus and second information to including a setting indicating whether a received print instruction should be executed by the printer connected to the second apparatus, wherein the first apparatus includes one or more memories storing instructions and one or more processors that, upon execution of the instructions configures the server system to operate as a second output unit configured to output sound based on the voice data transmitted by the first transmission unit using the first application, a display control unit configured to display on a display screen, using the first application, content that is communicated via the server system and shared with the second apparatus, and printer information about the printer connected to the second apparatus based on the first information and second information transmitted by the server system based on the acceptance of the participation requests from the first and second applications by the acceptance unit, and a print instruction unit configured to communicate, to the server system, a print instruction to instruct the second apparatus to perform printing of the content shared using the first application, wherein, the second application of the second apparatus displays the content shared from the first application via the server system and rejects the print instruction received from the server system when the second information indicates that the printer connected to the second apparatus is set to reject all print instructions.

* * * * *